(12) United States Patent
Suzuki

(10) Patent No.: US 10,675,906 B2
(45) Date of Patent: Jun. 9, 2020

(54) HOLOGRAM STRUCTURE

(71) Applicant: Dai Nippon Printing Co., Ltd., Tokyo (JP)

(72) Inventor: Shinichiro Suzuki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 115 days.

(21) Appl. No.: 15/752,014

(22) PCT Filed: Aug. 10, 2016

(86) PCT No.: PCT/JP2016/073626
§ 371 (c)(1),
(2) Date: Feb. 12, 2018

(87) PCT Pub. No.: WO2017/026521
PCT Pub. Date: Feb. 16, 2017

(65) Prior Publication Data
US 2018/0229534 A1 Aug. 16, 2018

(30) Foreign Application Priority Data
Aug. 13, 2015 (JP) .................................. 2015-159957
Aug. 13, 2015 (JP) .................................. 2015-159958

(51) Int. Cl.
*G03H 1/02* (2006.01)
*B42D 25/328* (2014.01)
(Continued)

(52) U.S. Cl.
CPC ........... *B42D 25/328* (2014.10); *B42D 25/45* (2014.10); *G02B 5/1857* (2013.01); *G02B 5/32* (2013.01);
(Continued)

(58) Field of Classification Search
None
See application file for complete search history.

(56) References Cited

U.S. PATENT DOCUMENTS 5,426,520 A * 6/1995 Kakae ...................... G03H 1/16
  235/457
6,252,685 B1 * 6/2001 Yokochi ................... G03H 1/26
  283/113
(Continued)

FOREIGN PATENT DOCUMENTS

JP  05-201182 A  8/1993
JP  05-48210 Y2  12/1993
(Continued)

OTHER PUBLICATIONS

International Search Report dated Nov. 15, 2016, issued for PCT/JP2016/073626.

*Primary Examiner* — Jennifer D. Carruth
(74) *Attorney, Agent, or Firm* — Locke Lord LLP

(57) ABSTRACT

A main object of the present disclosure is to provide a hologram structure having excellent forgery preventability and designability. The present disclosure achieves the object by providing a hologram structure comprising: a hologram layer including a reflection type hologram forming region carrying a recorded phase type Fourier transform hologram that transforms an incident light from a point light source into a desired optical image; and a vapor deposition layer formed so as to come into contact with a concavo-convex surface of the reflection type hologram forming region of the hologram layer, and a size of the reflection type hologram forming region in plan view is in a range of 5 mm square or more and 50 mm square or less.

12 Claims, 12 Drawing Sheets

(51) Int. Cl.
| | | |
|---|---|---|
| *B42D 25/45* | (2014.01) | |
| *G03H 1/30* | (2006.01) | |
| *G02B 27/01* | (2006.01) | |
| *G02B 5/32* | (2006.01) | |
| *G03H 1/00* | (2006.01) | |
| *G02B 5/18* | (2006.01) | |
| *G03H 1/04* | (2006.01) | |
| *G03H 1/16* | (2006.01) | |
| *G03H 1/22* | (2006.01) | |
| *B42D 25/23* | (2014.01) | |
| *B42D 25/24* | (2014.01) | |
| *B42D 25/29* | (2014.01) | |
| *B42D 25/324* | (2014.01) | |
| *B42D 25/36* | (2014.01) | |

(52) U.S. Cl.
CPC ....... *G02B 27/0172* (2013.01); *G03H 1/0011* (2013.01); *G03H 1/02* (2013.01); *G03H 1/0236* (2013.01); *G03H 1/0244* (2013.01); *G03H 1/0252* (2013.01); *G03H 1/0272* (2013.01); *G03H 1/0402* (2013.01); *G03H 1/16* (2013.01); *G03H 1/30* (2013.01); *B42D 25/23* (2014.10); *B42D 25/24* (2014.10); *B42D 25/29* (2014.10); *B42D 25/324* (2014.10); *B42D 25/36* (2014.10); *G02B 2027/0174* (2013.01); *G03H 2001/043* (2013.01); *G03H 2001/0415* (2013.01); *G03H 2001/2231* (2013.01); *G03H 2223/23* (2013.01); *G03H 2250/34* (2013.01); *G03H 2250/36* (2013.01); *G03H 2270/20* (2013.01)

(56) References Cited

U.S. PATENT DOCUMENTS

| | | | |
|---|---|---|---|
| 2004/0207891 A1 | 10/2004 | Suzuki | |
| 2005/0093856 A1 | 5/2005 | Borgsmuller et al. | |
| 2007/0013983 A1* | 1/2007 | Kitamura | G02B 5/1842 |
| | | | 359/3 |
| 2007/0070477 A1* | 3/2007 | Eto | G03H 1/0005 |
| | | | 359/12 |
| 2007/0284546 A1 | 12/2007 | Ryzi et al. | |
| 2008/0316556 A1* | 12/2008 | Eto | B44C 1/1704 |
| | | | 359/3 |

FOREIGN PATENT DOCUMENTS

| | | |
|---|---|---|
| JP | 2002-140682 A | 5/2002 |
| JP | 2002-215009 A | 7/2002 |
| JP | 2011-000760 A | 1/2011 |
| JP | 4872964 B2 | 2/2012 |
| JP | 2012-173535 A | 9/2012 |
| JP | 2012-242407 A | 12/2012 |
| JP | 2013-200084 A | 10/2013 |

\* cited by examiner

HOLOGRAM STRUCTURE

TECHNICAL FIELD

The present disclosure relates to a hologram structure having excellent forgery preventability and designability.

BACKGROUND ART

A hologram is an object of the wave front of an object light recorded on a photosensitive material as interference fringe by interference of two lights (object and reference lights) of the same wavelength. When a light of the same wavelength as the reference light used during interference fringe recording is irradiated, the interference fringe induces a diffraction phenomenon, and the wave front identical with that of the original object light may be reproduced. Since the holograms have many advantages such as favorable appearance and relative difficulty in copying, the holograms are used in, for example, forgery prevention applications.

Example of a known method for using a hologram is a method of reproducing an optical image by causing a hologram to transmit or reflect a reference light.

For example, Patent Literature 1 discloses carrying out an authenticity determination by using an optical image reproduced by projecting diffracted light reflected by a laser reflection type hologram onto a screen.

CITATION LIST

Patent Literature

Patent Literature 1: Japanese Patent No. 4872964

SUMMARY

Technical Problem

However, there is a problem that it is difficult to impart an advanced forgery prevention effect and an advanced design only by the optical image projected onto a screen as described in Patent Literature 1.

The present disclosure has been made in view of the problem described above, and a main object is to provide a hologram structure having excellent forgery preventability and designability.

Solution to Problem

In order to achieve the object, the present disclosure provides a hologram structure comprising: a hologram layer including a reflection type hologram forming region carrying a recorded phase type Fourier transform hologram that transforms an incident light from a point light source into a desired optical image; and a vapor deposition layer formed so as to come into contact with a concavo-convex surface of the reflection type hologram forming region of the hologram layer, and a size of the reflection type hologram forming region in plan view is 5 mm square or more.

According to the present disclosure, by using a hologram layer including a reflection type hologram forming region carrying a recorded phase type Fourier transform hologram that transforms an incident light from a point light source into a desired optical image (hereinafter, may be referred to merely as hologram forming region), the hologram structure is capable of reproducing an optical image in the hologram forming region in plan view by a point light source.

Also, since a size of the hologram forming region in plan view is in a range of 5 mm square or more and 50 mm square or less, an optical image may be reproduced visibly recognizable in the hologram forming region.

Accordingly, since the optical image reproduced in the hologram forming region is able to be combined with other functional layers such as a printing layer formed in the hologram structure, the hologram structure acquires excellent forgery preventability and designability.

In the disclosure, the reflection type hologram forming region preferably includes a plurality of arrayed hologram cells capable of transforming an incident light from a point light source into the optical image, and a size of the hologram cell in plan view is preferably in a range of 0.25 mm square or more and 5 mm square or less. This is because the hologram structure wherein the optical image in the hologram forming region is easily reproduced may be obtained.

In the disclosure, a grating pitch of the concavo-convex surface is preferably in a range of 1.0 μm to 80.0 μm. This is because the hologram structure wherein the optical image in the hologram forming region is easily reproduced may be obtained.

In the disclosure, the hologram structure further preferably comprises an image displaying layer that displays an image used in combination with the optical image. This is because the image displayed by the image displaying layer and the optical image reproduced in the hologram forming region may be combined, and the hologram structure acquires excellent forgery preventability and designability.

In the disclosure, the image displaying layer preferably includes a printed layer containing a colorant and a resin material. In the printed layer, an image of various colors and patterns may be easily drawn so that a hologram structure having excellent forgery preventability and designability may be formed easily.

In the disclosure, the image displaying layer preferably includes a second hologram layer containing a diffraction grating pattern drawn with a diffraction grating cell arranged in a pattern in plan view. The second hologram layer is capable of displaying an image only when the layer is irradiated with reference light so that a hologram structure having excellent forgery preventability and designability may be formed easily.

In the disclosure, the diffraction grating pattern is preferably a plane diffraction grating pattern capable of reproducing a planar pattern. This is because the plane diffraction grating pattern and the optical image may be combined, and thus the hologram structure acquires excellent forgery preventability and designability. Furthermore, this is because the luminance of a plane diffraction grating pattern may be easily increased, and a diffraction grating pattern having excellent visibility may be reproduced.

In the disclosure, the diffraction grating pattern is preferably a steric diffraction grating pattern capable of reproducing a stereoscopic pattern. This is because the steric diffraction grating pattern and the optical image may be combined, and thus the hologram structure acquires excellent forgery preventability and designability.

Also, in order to achieve the object, the present disclosure provides a hologram structure comprising: a hologram layer including a hologram forming region; and a vapor deposition layer formed so as to come into contact with a concavo-convex surface of the hologram forming region of the hologram layer, and the followings are arranged in the hologram forming region of the hologram layer: a hologram cell carrying a recorded phase type Fourier transform hologram that transforms an incident light from a point light source into a desired optical image; and a diffraction grating cell formed on a same plane as the hologram cell, the diffraction grating cell reproduces a diffraction grating pattern by being arranged in a pattern in plan view.

According to the present disclosure, since a hologram cell carrying a recorded phase type Fourier transform hologram that transforms an incident light from a point light source into a desired optical image and a diffraction grating cell that draws a diffraction grating pattern are arranged in the hologram forming region, both of the optical image and the diffraction grating pattern may be reproduced in the hologram forming region.

Accordingly, by combining the optical image and the diffraction grating pattern, the hologram structure acquires excellent forgery preventability and designability.

In the disclosure, the diffraction grating pattern is preferably a plane diffraction grating pattern capable of reproducing a planar pattern. This is because the plane diffraction grating pattern and the optical image may be combined, and thus the hologram structure acquires excellent forgery preventability and designability. Furthermore, this is because the luminance of a plane diffraction grating pattern may be easily increased, and a diffraction grating pattern having excellent visibility may be reproduced.

In the disclosure, a proportion of a total area of the diffraction grating cell to a total area of the hologram cell in the hologram forming region (the total area of the diffraction grating cell/the total area of the hologram cell) is preferably in a range of 1/4 to 3/2. This is because, when the proportion of area is in the range mentioned above, the hologram structure acquires excellent visibility of both the optical image and the planar diffraction grating pattern.

In the disclosure, the diffraction grating pattern is preferably a steric diffraction grating pattern capable of reproducing a stereoscopic pattern. This is because the steric diffraction grating pattern and the optical image may be combined, and thus the hologram structure acquires excellent forgery preventability and designability.

In the disclosure, a proportion of a total area of the diffraction grating cell to a total area of the hologram cell in the hologram forming region (the total area of the diffraction grating cell/the total area of the hologram cell) is preferably in a range of 1/3 to 3. This is because, when the proportion of area is in the range mentioned above, the hologram structure acquires excellent visibility of both the optical image and the steric diffraction grating pattern.

In the disclosure, the hologram structure further preferably comprises an adhesive layer formed on a surface, that is opposite side to the hologram layer, of the vapor deposition layer, and the hologram structure is preferably used as a hologram sticker. By being used as a hologram sticker, the hologram structure may easily impart an adherend with forgery preventability and designability.

In the disclosure, the hologram structure further preferably comprises: a heat sealing layer formed on a surface, that is opposite side to the hologram layer, of the vapor deposition layer; an easily peelable layer formed on a surface, that is opposite side to the vapor deposition layer, of the hologram layer; and a substrate for peeling formed on a surface, that is opposite side to the hologram layer, of the easily peelable layer, and the hologram structure is used preferably as a hologram transfer foil. By being used as a hologram transfer foil, the hologram structure may easily impart an adherend with forgery preventability and designability.

In the disclosure, the hologram structure is preferably used as an information recording medium. Since the hologram structure acquires excellent forgery preventability and designability, an information recording medium is capable of acquiring excellent forgery preventability and designability.

Advantageous Effects

The present disclosure exhibits effects that a hologram structure having excellent forgery preventability and designability may be provided.

DESCRIPTION OF EMBODIMENTS

The present disclosure relates to a hologram structure. A hologram structure according to the present disclosure will be hereinafter described in detail.

The hologram structure of the present disclosure may be classified into the following two embodiments: an embodiment (first embodiment) comprising a hologram layer including a reflection type hologram forming region carrying a recorded phase type Fourier transform hologram that transforms an incident light from a point light source into a desired optical image and a vapor deposition layer formed so as to come into contact with a concavo-convex surface of the reflection type hologram forming region of the hologram layer, and a size of the reflection type hologram forming region in plan view is 5 mm square or more; and an embodiment (second embodiment) comprising a hologram layer including a hologram forming region and a vapor deposition layer formed so as to come into contact with a concavo-convex surface of the hologram forming region of the hologram layer, and the followings are arranged in the hologram forming region of the hologram layer: a hologram cell carrying a recorded phase type Fourier transform hologram that transforms an incident light from a point light source into a desired optical image; and a diffraction grating cell formed on a same plane as the hologram cell and draws a diffraction grating pattern by being arranged in a pattern in plan view.

A hologram structure of the present disclosure will be hereinafter described in each embodiment.

A. First Embodiment

First, the first embodiment of the hologram structure according to the present disclosure will be described.

The hologram structure of the present embodiment features the configuration of comprising: a hologram layer including a reflection type hologram forming region carrying a recorded phase type Fourier transform hologram that transforms an incident light from a point light source into a desired optical image; and a vapor deposition layer formed so as to come into contact with a concavo-convex surface of the reflection type hologram forming region of the hologram layer, and a size of the reflection type hologram forming region in plan view is 5 mm square or more.

Such a hologram structure of the present embodiment will be explained with reference to the drawings.

Figure 1:
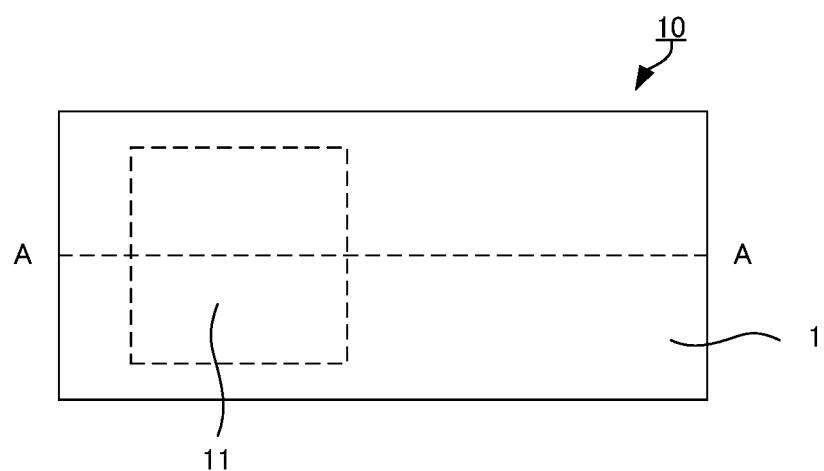
FIG. 1 is a schematic plan view showing an example of the hologram structure of the present disclosure.
Figure 2:
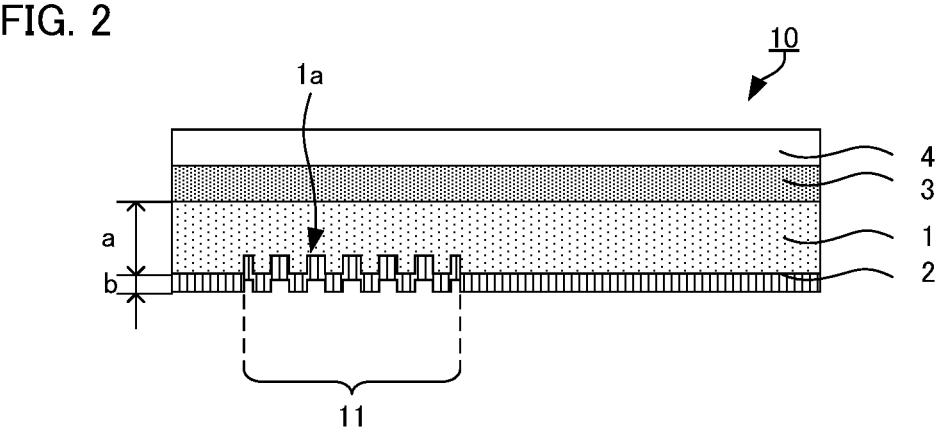
FIG. 2 is an A-A line cross-sectional view of FIG. 1.

FIG. 1 is a schematic plan view showing an example of the hologram structure of the present embodiment, and FIG. 2 is an A-A line cross-sectional view of FIG. 1. As shown in FIG. 1 and FIG. 2, hologram structure 10 of the present embodiment comprises hologram layer 1 including reflection type hologram forming region 11 carrying a recorded phase type Fourier transform hologram that transforms an incident light from a point light source into a desired optical image; and vapor deposition layer 2 formed so as to come into contact with concavo-convex surface 1a of reflection type hologram forming region 11 of hologram layer 1, a size of reflection type hologram forming region 11 in plan view is 5 mm square or more.

Incidentally, this example shows an example in which interlayer adhesive layer 3 and transparent substrate 4 are laminated in this order on a surface, that is opposite side to vapor deposition layer 2, of hologram layer 1.

Furthermore, in FIG. 1, the description of the transparent substrate and the interlayer adhesive layer is omitted for the simplicity of explanation. Also, in FIG. 1, the region surrounded by broken lines is hologram forming region 11.

According to the present embodiment, by using a hologram layer including a reflection type hologram forming region carrying a recorded phase type Fourier transform hologram that transforms an incident light from a point light source into a desired optical image, the hologram structure is capable of reproducing an optical image in the hologram forming region when a point light source is disposed on the opposite side to the concavo-convex surface (hereinafter, may be referred to as observation surface side) of the hologram layer, and the hologram layer is viewed in plan view from the observation surface side.

For this reason, the hologram structure may easily implement, for example, authenticity determination and exhibition of designability, without separately preparing, for example, a screen onto which an optical image is projected.

Also, the hologram structure acquires excellent forgery preventability and designability by combining other functional layer such as a printed layer formed in the hologram structure.

Furthermore, since an optical image may be reproduced only when the hologram structure is irradiated with light from a point light source, the hologram structure acquires excellent forgery preventability and designability.

Figure 3A:
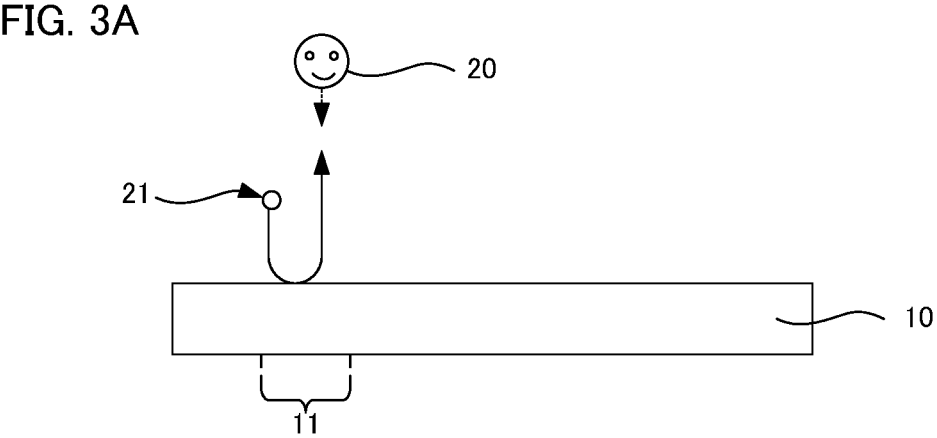
FIGS. 3A and 3B are illustrative drawings explaining a reproducing method for an optical image using a hologram structure.
Figure 3B:
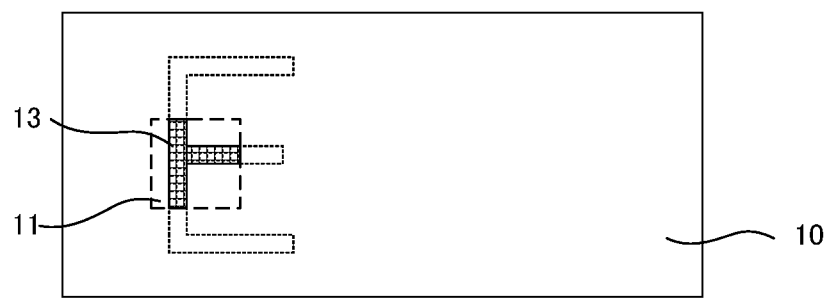
Figure 4A:
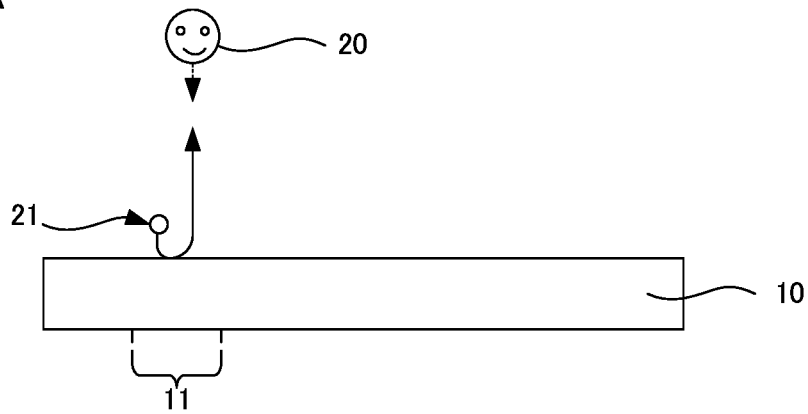
FIGS. 4A and 4B are illustrative drawings explaining a reproducing method for an optical image using a hologram structure.
Figure 4B:
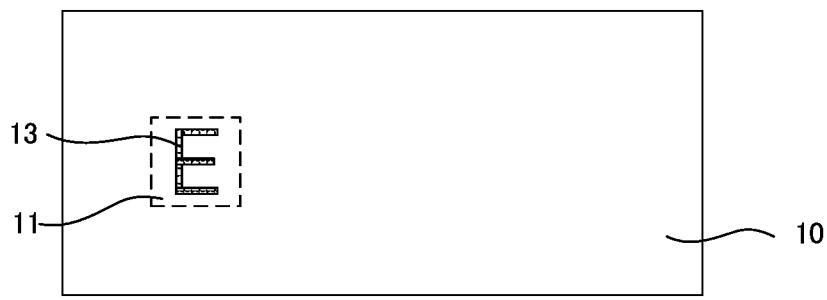

Also, as exemplified in FIGS. 3A and 3B, when the size in plan view of hologram forming region 11 is small, and the position of light source 21 is far from hologram structure 10 (FIG. 3A), observer 20 may be able to visually recognize only a portion of the whole image of optical image 13 (in FIG. 3B, the character "E") (FIG. 3B). Furthermore, as exemplified in FIGS. 4A and 4B, in order to make the entirety of the whole image of optical image 13 in hologram forming region 11 having a small size in plan view visually recognizable, it is necessary to bring light source 21 closer to hologram structure 10 (FIG. 4A). However, in this case, the size of reproduced optical image 13 (in FIG. 4B, the character "E") is small, and observer 20 may have difficulties in visually recognizing the information displayed by optical image 13 (FIG. 4B).

Figure 5A:
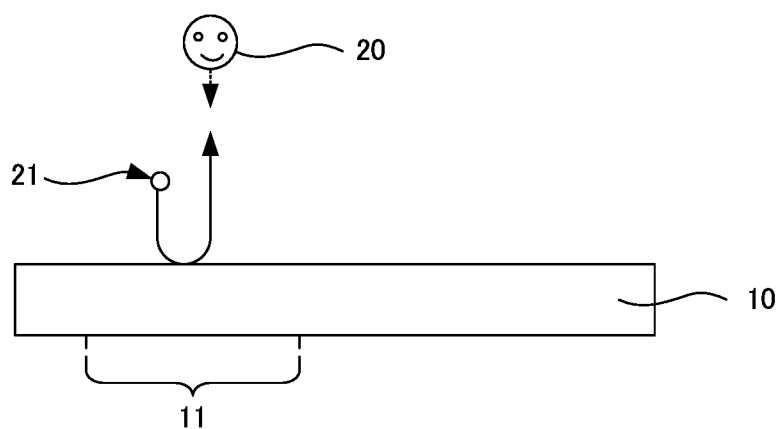
FIGS. 5A and 5B are illustrative drawings explaining a reproducing method for an optical image using a hologram structure.
Figure 5B:
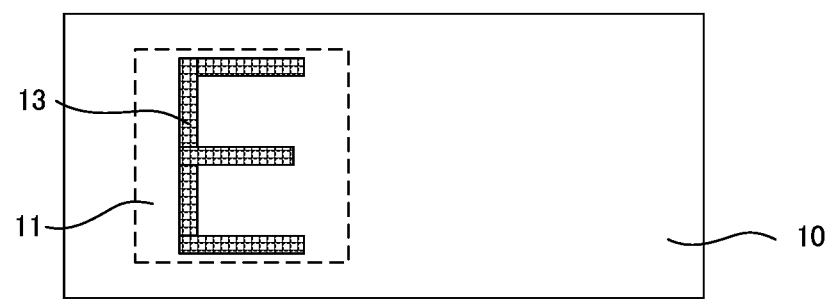

In contrast to this, as exemplified in FIGS. 5A and 5B, by the size in plan view of hologram forming region 11 being 5 mm square or more, observer 20 may visually recognize the entirety of the whole image of optical image 13 (in FIG. 5B, the character "E") in hologram forming region 11 (FIG. 5B), even when light source 21 is apart from hologram structure 10 (FIG. 5A). Furthermore, observer 20 may easily visually recognize the information displayed by reproduced optical image 13.

The hologram structure of the present embodiment has a hologram layer and a vapor deposition layer.

The hologram structure of the present embodiment will be hereinafter described in each constitution.

1. Hologram Layer

The hologram layer according to the present embodiment includes a reflection type hologram forming region carrying a recorded phase type Fourier transform hologram that transforms an incident light from a point light source into a desired optical image.

A size of the hologram forming region in plan view is 5 mm square or more.

Here, a phase type Fourier transform hologram being recorded means that the phase information of a Fourier transform image, obtained through Fourier transformation of an original image, is multivalued, and thereby the information is recorded as depth. Therefore, in the hologram forming region of a hologram layer carrying a recorded phase type Fourier transform hologram, a concavo-convex surface is formed.

The hologram layer transforms an incident light from a point light source into a desired optical image, by means of the elevation difference of the concavo-convex shapes that constitute the concavo-convex surface of the hologram forming region, that is, the hologram layer functions as a Fourier transform lens. Due to such a function, an incident light from an arbitrary point light source is diffracted in a plurality of predetermined directions, and a predetermined image is formed as an optical image. Incidentally, the function mentioned above may be occasionally referred to as "Fourier transform lens function".

The hologram forming region is of reflection type and is capable of reproducing an optical image in the hologram forming region when a point light source is disposed on the observation surface side, and the hologram layer is viewed in plan view from the observation surface side.

The hologram forming region refers to a region capable of transforming an incident light from a point light source into a desired optical image, and specifically, the hologram forming region is a region surrounded by a rectangle having the minimum area that may include all of the hologram cells capable of transforming into the optical image.

According to the present embodiment, the size of the hologram forming region in plan view being 5 mm square or more means that the hologram forming region has a shape in plan view including at least the range of a 5 mm square. Therefore, when the hologram forming region is rectangular in shape, it means that the length of a short side thereof is 5 mm or more, and when the hologram forming region is square in shape, it means that the length of a side thereof is 5 mm or more.

According to the present embodiment, the size in plan view is preferably in a range of 5 mm square or more and 50 mm square or less, more preferably in a range of 5 mm square or more and 30 mm square or less, and particularly preferably in a range of 5 mm square or more and 15 mm square or less. This is because, when the lower limit of the size in plan view is in the range mentioned above, the hologram structure wherein the optical image in the hologram forming region is easily visually recognizable may be obtained. As a result, the hologram structure acquires excellent forgery preventability and designability.

Furthermore, when the upper limit of the size in plan view is in the range mentioned above, the hologram structure is able to promote cost reduction, and an image displaying layer displaying an image that is used in combination with, for example, an optical image, may be easily formed.

Figure 6A:
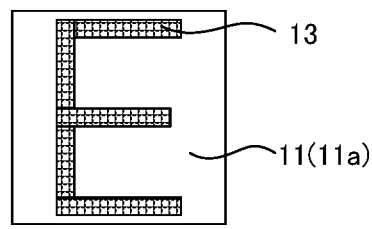
FIGS. 6A and 6B are illustrative drawings explaining a hologram forming region in the present disclosure.

According to the present embodiment, the hologram forming region may be hologram forming region 11 comprising one hologram cell 11a carrying a recorded phase type Fourier transform hologram that transforms an incident light from a point light source into a desired optical image (hereinafter, may be simply referred to as hologram cell), as shown in FIG. 6A (hereinafter, may be simply referred to as single hologram region). However, the hologram forming region is usually hologram forming region 11 enlarged by arranging a plurality of hologram cells 11a as shown in FIG. 6B (hereinafter, may be referred to as large-sized hologram region).

Figure 6B:
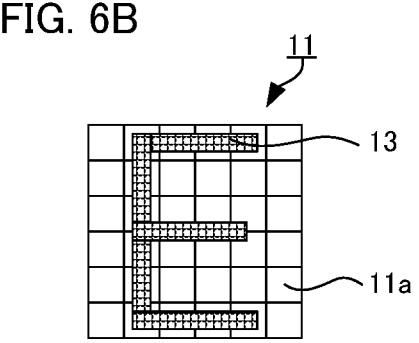

Incidentally, the character "E" in FIGS. 6A and 6B is optical image 13 respectively exhibited in a single hologram region or a large-sized hologram region.

When the hologram forming region is a large-sized hologram region, a size in plan view of individual hologram cells that constitute the hologram forming region may be any size capable of forming a hologram forming region with high accuracy.

The size in plan view is preferably in a range of 0.25 mm square or more and 5 mm square or less. This is because, when the size in plan view is in the range mentioned above, the hologram structure wherein the optical image in the hologram forming region is easily reproduced may be obtained.

Incidentally, the size in plan view refers to the size of a minimum square that may include the hologram cell. Therefore, when the hologram cell is a square with a side of 1 mm, the size in plan view is 1 mm square. Furthermore, when the shape in plan view of the hologram cell is a circular shape of 1 mm diameter, the size in plan view is 1 mm square.

The proportion of the area in plan view occupied by the hologram cell in the hologram forming region is not particularly limited as long as a desired optical image may be reproduced; however, the proportion is preferably 25% or more, and more desirably 50% or more. This is because, when the area proportion is in the range mentioned above, the hologram structure capable of reproducing a clear optical image may be obtained.

The shape in plan view of the hologram cell may be any shape as long as a hologram forming region having a desired shape in plan view may be formed, and may be any arbitrary shape. Specifically, the shape in plan view may be a rectangular shape such as a square shape and a rectangular shape; a polygonal shape such as a trapezoidal shape, a triangular shape, a pentagonal shape, and a hexagonal shape; a circular shape; an elliptical shape, a star shape, or a heart shape. However, from the viewpoint of the ease of forming the hologram forming region, a rectangular shape is usually used.

According to the present embodiment, the concavo-convex shape of the concavo-convex surface of the hologram forming region corresponds to a pattern of a Fourier transform image obtainable when a plurality of multivalued Fourier transform images, formed based on the image data of an original image to be displayed as an optical image, are arrayed to a desired range in the vertical direction and the transverse direction.

The method for forming such a concavo-convex surface in the hologram forming region may be any method capable of forming a concavo-convex surface capable of transforming an incident light from a point light source into a desired optical image, and a general method for forming a Fourier transform hologram may be used.

Specifically, the forming method mentioned above may include a method forming a concavo-convex surface of the hologram forming region by forming a master original plate having a concavo-convex pattern corresponding to the Fourier transform image, and transferring the concavo-convex pattern of the original plate to a coating film of a resin material such as an ultraviolet-curable resin formed on a substrate such as PET.

Furthermore, a single hologram region comprising one hologram cell may be formed as the hologram forming region, by performing the transfer of the concavo-convex pattern of the master original plate only once. When the transfer of the concavo-convex pattern of the master original plate is performed several times, a hologram layer having a large-sized hologram forming region of a desired size including a plurality of arrayed hologram cells as the hologram forming region may be formed.

Regarding a method for forming the master original plate, a Fourier transform image is formed by calculation based on the image data of the original image to be displayed. Next, the data of the Fourier transform image that have been multivalued into binary or higher are transformed to data for electron beam lithography, and the data for electron beam lithography are arrayed to a desired range. For example, the data for electron beam lithography are arrayed such that ten data values are put in the vertical direction and the transverse direction, respectively. Next, a method for producing a master original plate by an electron beam lithographic apparatus based on the arrayed data for electron beam lithography may be used.

Figure 7A:
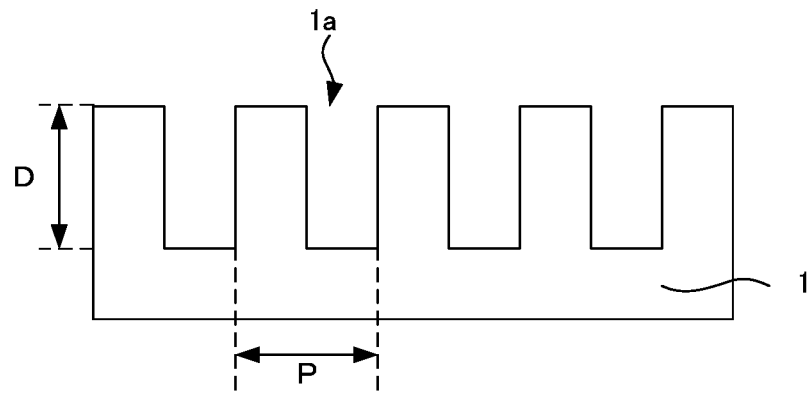
FIGS. 7A and 7B are illustrative drawings explaining a hologram forming region in the present disclosure.
Figure 7B:
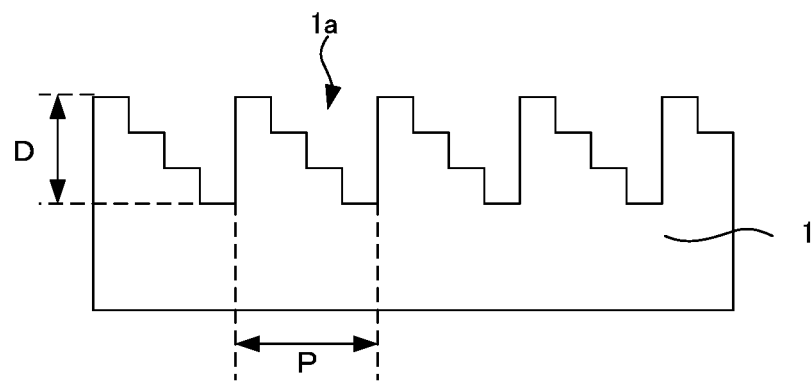

When binarized data after the Fourier transformation are used as the data for electron beam lithography, the concavo-convex shape of the concavo-convex surface will be a two-staged concavo-convex shape as shown in FIG. 7A, and when using quaternarized data, the concavo-convex shape will be a four-staged concavo-convex shape as shown in FIG. 7B.

According to the present embodiment, it is preferable that multivaluing of the data of the Fourier transform image is multivaluing into quaternary or higher, that is, the concavo-convex shape is a four-staged or higher concavo-convex shape. This is because an optical image of a complicated shape may be reproduced.

The grating pitch of the concavo-convex surface may be any grating pitch capable of transforming an incident light from a point light source into a desired optical image.

Specifically, the grating pitch is preferably in a range of 1.0 μm to 80.0 μm. This is because, when the grating pitch is in the range mentioned above, the hologram structure wherein the optical image in the hologram forming region is easily reproduced may be obtained.

Incidentally, the grating pitch refers to, for example, the width represented by P in FIGS. 7A and 7B.

Figure 8:
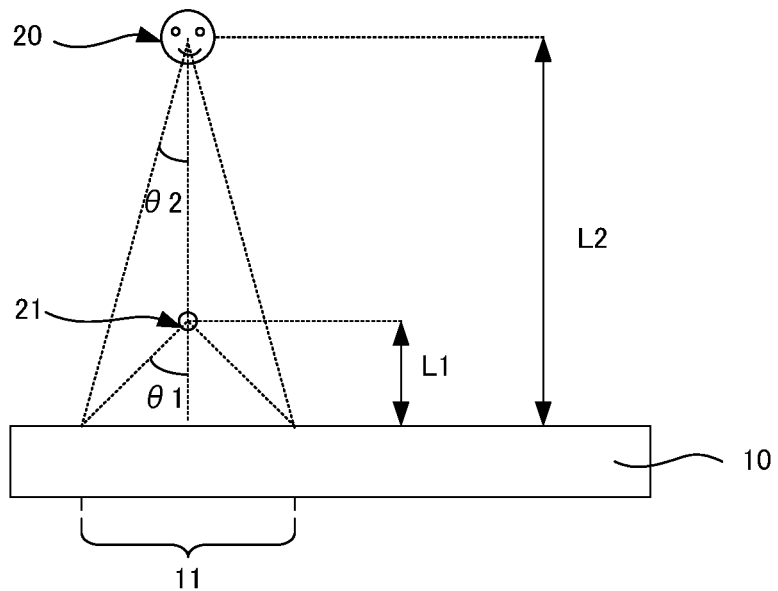
FIG. 8 is an illustrative drawing explaining a hologram forming region in the present disclosure.

Here, as exemplified in FIG. 8, when a light source is disposed at a position of predetermined distance L1 from the hologram forming region of hologram structure 10, and observer 20 observes the hologram forming region at a position of predetermined distance L2 from the hologram forming region, the following formula (1) may be established for the grating pitch, in order for observer 20 to be able to observe the whole image of the optical image in the entire region of the hologram forming region.

Incidentally, λ represents the wavelength of diffracted light; P represents the grating pitch of the concavo-convex surface; θ1 represents an incident angle at which light reaches from a light source to an edge of the hologram forming region; θ2 represents a diffraction angle at which diffracted light coming from an edge of the hologram forming region to reach the observer; and n represents the order of diffraction.

$$P = n\lambda/(\sin\theta1 + \sin\theta2) \quad (1)$$

As a specific calculation example for the grating pitch, when the hologram forming region is a square shape with a 15 mm side, L1 is 50 mm, L2 is 300 mm, and the wavelength of light is 550 nm, the values are calculated as sin θ2=0.025 and sin θ1=0.148. Thus, the grating pitch P required for an observer to be able to observe the whole image of the optical image in the entire region of the hologram forming region is calculated to be 3,179 nm at the minimum.

Furthermore, when the hologram forming region is a square shape with a 15 mm side, L1 is 1,990 mm, L2 is 2,000 mm, and the wavelength of light is 550 nm, the values are calculated as sin θ2=0.00374 and sin θ1=0.00377. The grating pitch P is calculated to be 73,236 nm at the minimum.

Furthermore, when the hologram forming region is a square shape with a 10 mm side, L1 is 60 mm, L2 is 60 mm, and the wavelength of light is 550 nm, the values are calculated as sin θ2=0.083 and sin θ1=0.083. The grating pitch P is calculated to be 3,313 nm at the minimum.

The depth of the concavo-convex shape may be about 0.01 μm.

Incidentally, the depth is, for example, a dimension represented by D in FIGS. 7A and 7B.

Regarding the hologram forming region, the wavelength of the point light source that may exhibit the Fourier transform lens function mentioned above is not particularly limited, and the wavelength may be set to any desired wavelength. The wavelength of the point light source is not limited to a monochromatic light having a single wavelength, and may be a light including multiple wavelengths or may also be white light.

The material that constitutes the hologram layer is not particularly limited as long as the material may form a concavo-convex shape for exhibiting the Fourier transform lens function mentioned above in the hologram forming region and exhibiting a predetermined refractive index. The refractive index exhibited by the material that constitutes the hologram layer is not particularly limited and may be set as appropriate according to the use of the hologram structure of the present embodiment.

The reference wavelength for the refractive index is also not particularly limited and may be selected as appropriate from a range of 400 nm to 750 nm. Among the above, according to the present embodiment, the refractive index at a wavelength of 555 nm is preferably in a range of 1.3 to 2.0, and particularly preferably in a range of 1.33 to 1.8. Here, the refractive index may be measured by a spectroscopic ellipsometer.

Regarding the material of the hologram layer, resin materials that have been conventionally used in, for example, the formation of a relief type hologram, for example, cured products of curable resins such as a thermosetting resin, an ultraviolet-curable resin, and an ionizing radiation-curable resin; and a thermoplastic resin may be used.

Examples of the thermosetting resin may include an unsaturated polyester resin, an acrylic-modified urethane resin, an epoxy-modified acrylic resin, an epoxy-modified unsaturated polyester resin, an alkyd resin, and a phenolic resin. Also, examples of the thermoplastic resin may include an acrylic acid ester resin, an acrylamide resin, a nitrocellulose resin, and a polystyrene resin. These resins may be homopolymers or may be copolymers each comprising two kinds or more of constituent components. Also, these resins may be used singly, or two kinds or more thereof may be used in combination.

The thermosetting resin or thermoplastic resin mentioned above may include various isocyanate compounds; metal soaps such as cobalt naphthenate and zinc naphthenate; organic peroxides such as benzoyl peroxide and methyl ethyl ketone peroxide; and thermal or ultraviolet curing agents such as benzophenone, acetophenone, anthraquinone, naphthoquinone, azobisisobutyronitrile, and diphenyl sulfide.

Furthermore, examples of the ionizing radiation-curable resin may include an epoxy-modified acrylate resin, a urethane-modified acrylate resin, and an acrylic-modified polyester resin, and among the above, a urethane-modified acrylate resin is preferable, while a urethane-modified acrylic resin represented by the chemical formula disclosed in Japanese Patent Application Laid-Open (JP-A) 2007-017643 A is particularly preferable.

When curing the ionizing radiation-curable resin, for example, monofunctional or polyfunctional monomers and oligomers may be used in combination for the purpose of adjusting the crosslinked structure and viscosity. Examples of the monofunctional monomers may include mono(meth) acrylates such as tetrahydrofurfuryl (meth)acrylate, hydroxyethyl (meth)acrylate, vinylpyrrolidone, (meth)acryloyloxyethyl succinate, and (meth)acryloyloxyethyl phthalate. Furthermore, examples of bifunctional or higher monomers may include, as classified based on the skeletal structure, polyol (meth)acrylates (for example, an epoxy-modified polyol (meth)acrylate and a lactone-modified polyol (meth)acrylate), polyester (meth)acrylates, epoxy (meth)acrylates, urethane (meth)acrylates, as well as poly (meth)acrylates having polybutadiene-based, isocyanuric acid-based, hydantoin-based, melamine-based, phosphoric acid-based, imide-based, and phosphazene-based skeletons. Furthermore, various ultraviolet-curable or electron beam-curable monomers, oligomers, and polymers may be utilized.

More particularly, examples of bifunctional monomers and oligomers may include polyethylene glycol di(meth) acrylate, polypropylene glycol di(meth)acrylate, neopentyl glycol di(meth)acrylate, and 1,6-hexanediol di(meth)acrylate. Examples of trifunctional monomers, oligomers, and polymers may include trimethylolpropane tri(meth)acrylate, pentaerythritol tri(meth)acrylate, and aliphatic tri(meth) acrylates. Examples of the tetrafunctional monomers and oligomers may include pentaerythritol tetra(meth)acrylate, ditrimethylolpropane tetra(meth)acrylate, aliphatic tetra(meth)acrylates. Examples of pentafunctional or higher monomers and oligomers may include dipentaerythritol penta (meth)acrylate and dipentaerythritol hexa(meth)acrylate. Further examples may include (meth)acrylates having a polyester skeleton, a urethane skeleton, and a phosphazene skeleton. The number of functional groups is not particularly limited; however, if the number of functional groups is smaller than 3, heat resistance tends to deteriorate. Furthermore, when the number of functional groups is more than 20, flexibility tends to deteriorate. Therefore, the number of functional groups is particularly preferably in a range of 3 to 20.

The content of the monofunctional or polyfunctional monomers and oligomers such as described above may be adjusted as appropriate, and usually, the content is preferably adjusted to be 50 parts by weight or less with respect to 100 parts by weight of the ionizing radiation-curable resin, and more preferably in a range of 0.5 parts by weight to 20 parts by weight.

Furthermore, if necessary, additives such as a photopolymerization initiator, a polymerization inhibitor, a deterioration preventing agent, a plasticizer, a lubricating agent, a colorant such as a dye and a pigment, a surfactant, an antifoaming agent, a leveling agent, and a thixotropy imparting agent, may also be added as appropriate to the hologram layer.

The film thickness of the hologram layer is, when the hologram layer has self-supporting properties, preferably in a range of 0.05 mm to 5 mm, and more preferably in a range of 0.1 mm to 3 mm. Meanwhile, when the hologram layer does not have self-supporting properties and is formed on a transparent substrate that will be described below, the film thickness of the hologram layer is preferably in a range of 0.1 μm to 50 μm, and more preferably in a range of 2 μm to 20 μm.

Incidentally, the film thickness of the hologram layer is specifically a distance represented by the reference character a in FIG. 2 that has been explained previously.

The size in plan view of the hologram layer may be set as appropriate according to the use of the hologram structure of the present embodiment.

The hologram layer according to the present embodiment includes at least a hologram forming region, and the hologram layer may also include a region wherein a concavo-convex shape is not formed (non-hologram forming region), besides the hologram forming region.

The proportion occupied by each region mentioned above in the hologram layer is not particularly limited, and may be selected as appropriate according to the use.

2. Vapor Deposition Layer

The vapor deposition layer according to the present embodiment is formed so as to come into contact with the concavo-convex surface of the hologram forming region of the hologram layer.

The vapor deposition layer may have transparency or may have reflectivity.

When the vapor deposition layer is a transparent vapor deposition layer having transparency, the hologram structure is a hologram structure wherein the hologram forming region does not have gloss when viewed in plan view. Therefore, the hologram structure has the hologram forming region concealed, and the hologram structure acquires excellent forgery preventability and designability.

Meanwhile, when the vapor deposition layer is a reflective vapor deposition layer having reflectivity, the hologram structure is able to reproduce an optical image clearly in the hologram forming region. Therefore, the hologram structure acquires excellent forgery preventability and designability.

Regarding the transparent vapor deposition layer, the total light transmittance (hereinafter, may be simply referred to as luminous transmittance) is preferably 80% or higher, and more preferably 90% or higher. This is because, when having the luminous transmittance mentioned above, the hologram forming region of the hologram structure is more effectively concealed.

Incidentally, the luminous transmittance is a value measured according to JIS K7361-1 (Plastics—Determination of the total luminous transmittance of transparent materials).

The material constituting the vapor deposition layer is not particularly limited as long as the material causes a difference in the refractive index between the vapor deposition layer and the hologram layer. Examples of the material capable of forming the reflective vapor deposition layer may include metals such as Mg, Al, Ti, Cr, Fe, Co, Ni, Cu, Zn, Ga, Ge, Se, Rb, Pd, Ag, Cd, In, Sn, Sb, Te, Au, Pb, and Bi.

Examples of the material capable of forming the transparent vapor deposition layer may include oxides of the metals mentioned above.

The materials mentioned above may be used singly, or two or more materials may be used in combination.

The thickness of the vapor deposition layer may be appropriately set from the viewpoints of, for example, desired reflectivity, color tone, design, and use. For example, the thickness is preferably in a range of 50 Å to 1 μm, and more preferably in a range of 100 Å to 1000 Å.

The thickness mentioned above is preferably 200 Å or less from the viewpoint of imparting transparency to the vapor deposition layer, and a thickness of more than 200 Å is preferable from the viewpoint of imparting concealability to the vapor deposition layer.

Incidentally, the thickness of the vapor deposition layer is specifically a distance represented by reference character b in FIG. 2 that has been described previously.

The site of forming the vapor deposition layer may be any site that overlaps in plan view with at least the entire concavo-convex surface in the hologram forming region, or may be any site that covers the entire surface of the hologram layer on the concavo-convex surface side.

Regarding a method for forming the vapor deposition layer, any general method for forming a vapor deposition layer may be used, and examples may include a vacuum vapor deposition, a sputtering method, and an ion plating method.

3. Other Constitutions

The hologram structure of the present embodiment includes a hologram layer; however, the hologram structure may include other constitutions as necessary.

(1) Transparent Substrate

The hologram structure of the present embodiment may also include a transparent substrate formed on a surface, that is opposite side to the vapor deposition layer, of the hologram layer. This is because, by including a transparent substrate, the thermal or mechanical strength of the hologram structure of the present embodiment may be increased.

The transparent substrate may be formed so as to be in direct contact with the hologram layer, or may be formed with other layers interposed therebetween.

For example, the transparent substrate may be adhered to a surface of the hologram layer, via an interlayer adhesive layer that will be described below.

The luminous transmittance of the transparent substrate is preferably 80% or higher, and more preferably 90% or higher. This is because, when the luminous transmittance of the transparent substrate is in the range mentioned above, the hologram structure wherein the optical image is easily visually recognizable may be obtained.

Furthermore, the haze value of the transparent substrate is preferably low as possible, and specifically, the haze value is preferably in a range of 0.01% to 5%, more preferably in a range of 0.01% to 3%, and particularly preferably in a range of 0.01% to 1.5%. This is because, when the haze value of the transparent substrate is in the range mentioned above, display of an optical image exhibited in the hologram forming region is enabled without inhibiting visibility. Incidentally, the haze value of the transparent substrate is a value measured according to JIS K7136.

The constituent material of the transparent substrate is not particularly limited as long as the material exhibits the luminous transmittance and haze value mentioned above. For example, resin films such as a polyethylene terephthalate, a polycarbonate, an acrylic resin, a cycloolefin resin, a polyester resin, a polystyrene resin, and an acrylic-styrene resin; and glass such as quartz glass, PYREX (registered trademark), and a synthetic quartz plate, may be used. Among the above, regarding the transparent substrate, a resin film is preferably used from the viewpoint of the lightweight and of having fewer risks such as damage, and a polycarbonate is most preferred in view of birefringence.

The transparent substrate may include additives as necessary.

Examples of the additives may include a dispersant, a filler, a plasticizer, and an antistatic agent.

The film thickness of the transparent substrate may be any thickness capable of having a rigidity and strength suitable for supporting, for example, the hologram layer. The film thickness is, for example, preferably about 0.005 mm to 5 mm, and more preferably in a range of 0.02 mm to 1 mm.

The shape of the transparent substrate is not particularly limited and may be selected as appropriate according to the form of usage of the hologram structure of the present embodiment.

The transparent substrate may be subjected to, for example, a corona treatment on the surface in order to enhance adhesiveness to other layers.

(2) Image Displaying Layer

The hologram structure of the present embodiment preferably includes an image displaying layer that displays an image used in combination with the optical image.

This is because the image displayed by the image displaying layer and the optical image reproduced in the hologram forming region may be combined, and the hologram structure acquires excellent forgery preventability and designability.

Here, the image described above is not particularly limited as long as the image may enhance forgery preventability and designability when combined with an optical image.

Specifically, the image may be set as appropriate according to, for example, the use of the hologram structure of the present embodiment, and examples may include, not only a pattern, a line drawing, a character, a figure, and a symbol, but also an embodiment in which the entire surface is simply colored.

Figure 9A:
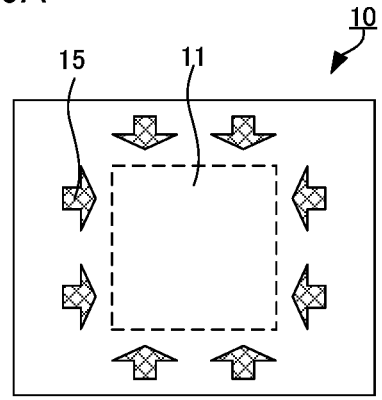
FIGS. 9A to 9F are illustrative drawings explaining an image displaying layer in the present disclosure.
Figure 9B:
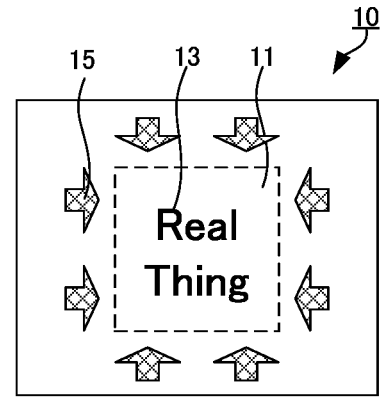
Figure 9C:
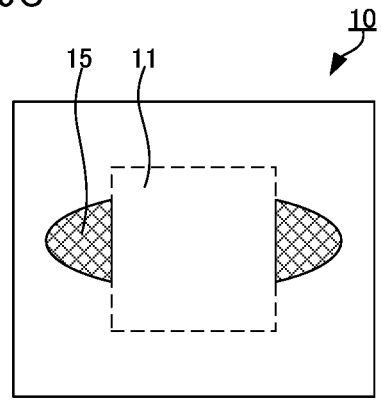
Figure 9D:
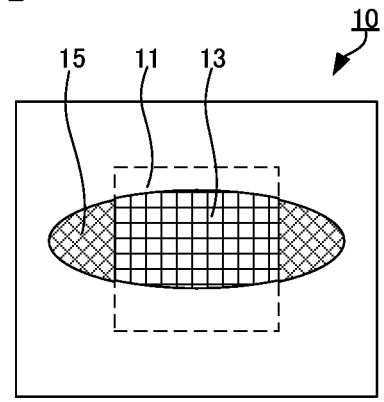
Figure 9E:
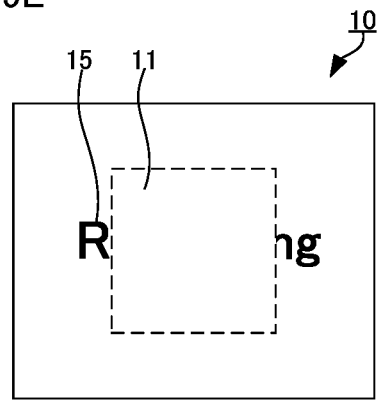
Figure 9F:
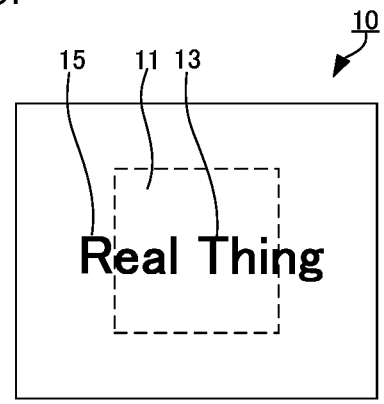

Furthermore, regarding an image that may further enhance forgery preventability and designability when combined with the optical image, examples may include images used for the recognition of the hologram forming region as exemplified in FIG. 9A and FIG. 9B, such as an arrow indicating the formation site of the hologram forming region, a frame surrounding the formation site, and a character indicating that a certain site is the formation site; when the optical image displays a portion of a figure as exemplified in FIG. 9C and FIG. 9D, an image that displays the other parts of the figure; when the optical image is an image displaying a portion of a character string or a number sequence as exemplified in FIG. 9E and FIG. 9F, an image displaying the other parts of the character string or number sequence; and when the optical image is an image displaying the sun, an image that forms a single image imparting a unity feeling by the combination with an optical image reproduced in the hologram forming region, such as an image displaying the background such as clouds and the sky disposed around the sun.

Incidentally, FIG. 9A, FIG. 9C, and FIG. 9E each represents the state before reproduction of the optical image, and FIG. 9B, FIG. 9D, and FIG. 9F each represents the state at the time of reproducing the optical image.

Furthermore, in FIG. 9A and FIG. 9B, images 15 are the arrows indicating the formation site of hologram forming region 11, and is capable of reproducing a character string displaying "Real Thing" as optical image 13 in the hologram forming region 11. In FIG. 9C and FIG. 9D, image 15 is a portion of an ellipse, and is capable of displaying one ellipse in combination with the other part of the ellipse displayed by optical image 13. In FIG. 9E and FIG. 9F, image 15 is a portion of a character string of "Real Thing", and is capable of displaying one meaningful character string "Real Thing" when combined with the other parts of the character string "Real Thing" displayed by optical image 13.

The image displaying layer may be any layer capable of displaying a desired image, and examples may include a printed layer containing a colorant and a resin material; and a second hologram layer containing a diffraction grating pattern drawn with a diffraction grating cell arranged in a pattern in plan view.

In the printed layer, an image of various colors and patterns may be easily drawn. The second hologram layer is capable of displaying an image only when the layer is irradiated with reference light. Therefore, the printed layer and the second hologram layer are capable of easily forming a hologram structure having excellent forgery preventability and designability.

The image displaying layer may be of only one kind, or two kinds or more may be used in combination. For example, the image displaying layer may be configured to include a plurality of printed layers, or to include a printed layer and a second hologram layer.

In the following description, the printed layer and the second hologram layer will be explained.

(a) Printed Layer

The printed layer is a layer containing a colorant and a resin material.

Regarding the resin material, resins such as polycarbonates, polyesters, cellulose derivatives, norbornene-based resins, polyvinyl chlorides, polyvinyl acetates, acrylic resins, urethane-based resins, polypropylene-based resins, polyethylene-based resins, and styrene-based resins may be used.

Regarding the colorant, any colorant generally used for the printed layer may be used, and examples may include pigments such as inorganic pigments and organic pigments; and dyes such as acidic dyes, direct dyes, disperse dyes, oil-soluble dyes, metal-containing oil-soluble dyes, and sublimable coloring materials.

Furthermore, regarding the colorant material, fluorescence-emitting materials such as ultraviolet-emitting materials and infrared-emitting materials that emit fluorescence by absorbing ultraviolet ray or infrared ray; polarized cholesteric polymer liquid crystal pigments; and particles that serve as reflecting mirrors, such as glass beads, may also be used.

Regarding the method for forming the printed layer, that is, the printing method, a method similar to a general method for forming a printed layer may be used. Regarding the printing method, specifically, examples may include various printing methods such as inkjet printing, screen printing, offset printing, gravure printing, and flexographic printing.

Furthermore, regarding the ink used for the printed layer, any ink used for forming a general printed layer may be used, and a product obtained by dispersing or dissolving the resin material and the colorant in a solvent may be used.

The formation position of the printed layer is not particularly limited as long as the position does not interrupt reproduction and visual recognition of an optical image in the hologram forming region, and the position may be on the surface, that is opposite side to the vapor deposition layer, of the hologram layer; on the same plane as the hologram layer; or on the surface, that is opposite side to the hologram layer, of the vapor deposition layer.

The printed layer may overlap in plan view with the hologram forming region; however, usually, the printed layer does not overlap with the hologram forming region.

Figure 10:
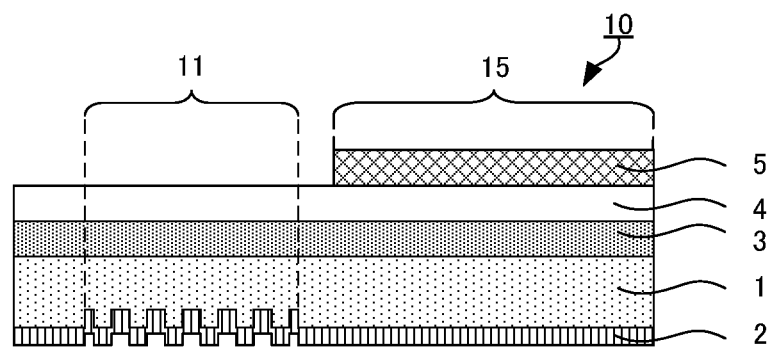
FIG. 10 is a schematic cross-sectional view showing another example of the hologram structure of the present disclosure.

FIG. 10 shows an example in which printed layer 5 is formed on a surface, that is opposite side to hologram layer 1, of transparent substrate 4.

(b) Second Hologram Layer

The second hologram layer contains a diffraction grating pattern drawn with a diffraction grating cell arranged in a pattern in plan view, and a pattern, having a shape of an arranged pattern of the diffraction grating cells, is reproduced when irradiated with the reference light.

Here, the diffraction grating pattern is a pattern drawn with the diffraction grating cells arranged in a pattern in plan view, and is drawn by dividing an original pattern into, for example, checkerboard-shaped fine cells, and transferring the divided fine cells into a diffraction grating.

Figure 11A:
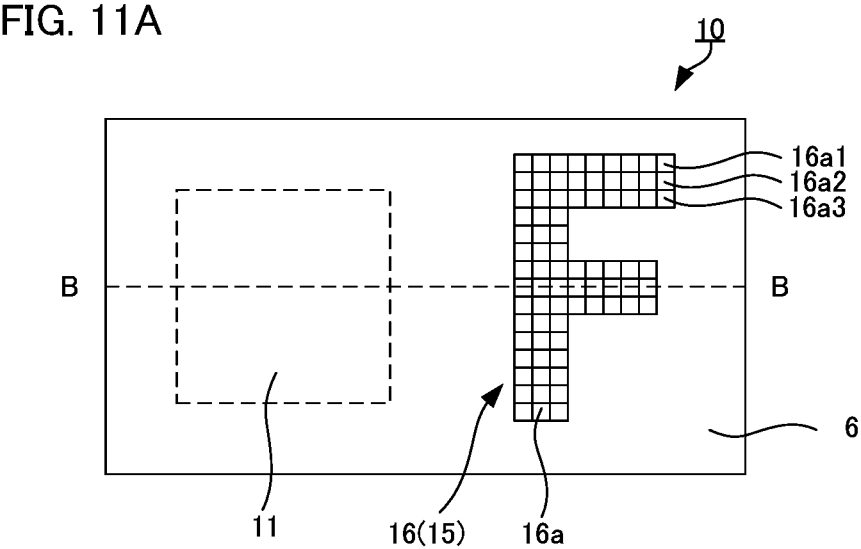
FIG. 11A is a schematic plan view and FIG. 11B is a schematic cross-sectional view showing another example of the hologram structure of the present disclosure.
Figure 11B:
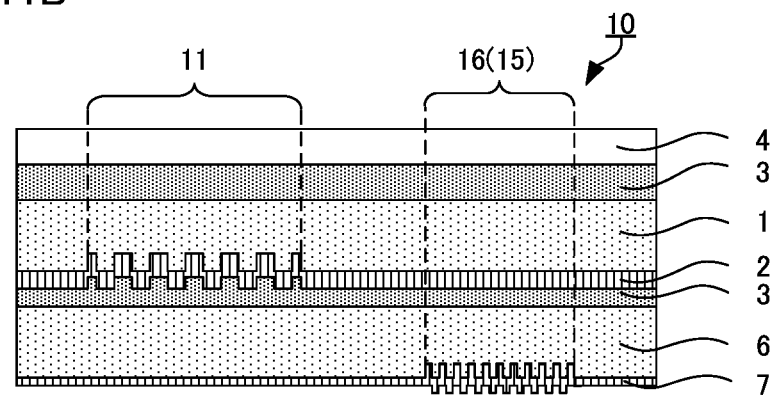

FIG. 11A is a schematic plan view showing an example of the hologram structure including a second hologram layer, and FIG. 11B is a B-B line cross-sectional view of FIG. 11A. FIG. 11B shows hologram structure 10 in which second hologram layer 6 and second vapor deposition layer 7 are laminated in this order via interlayer adhesive layer 3 on a surface, that is opposite side to hologram layer 1, of vapor deposition layer 2. Furthermore, FIG. 11A shows an example using second hologram layer 6 containing diffraction grating pattern 16 in which diffraction grating cells 16a are arranged in a pattern of the character "F", and the character "F" is reproduced in diffraction grating pattern 16 when irradiated with reference light.

Incidentally, in FIG. 11A, the description of the transparent substrate, the interlayer adhesive layer, the hologram layer, and the vapor deposition layer is omitted for the reason of ease of explanation.

The diffraction grating pattern may be a plane diffraction grating pattern capable of reproducing a planar pattern, or may be a steric diffraction grating pattern capable of reproducing a stereoscopic pattern.

This is because, when the diffraction grating pattern is a plane diffraction grating pattern, the plane diffraction grating pattern and the above-described optical image may be combined, and thus the hologram structure acquires excellent forgery preventability and designability. Furthermore, this is because the luminance of a plane diffraction grating pattern may be easily increased, and a diffraction grating pattern having excellent visibility may be reproduced.

This is because, when the diffraction grating pattern is a steric diffraction grating pattern, the steric diffraction grating pattern and the above-described optical image may be combined, and thus the hologram structure acquires excellent forgery preventability and designability.

The diffraction grating pattern may be a plane diffraction grating pattern or a steric diffraction grating pattern, or may be a combination of the two.

As a method for forming the plane diffraction grating pattern, examples may include a method of drawing a diffraction grating pattern by using diffraction grating cells whose amplitude of diffracted light is of the same extent.

Furthermore, as a method for adjusting the amplitude of diffracted light to the same extent, examples may include a method, as described in Japanese Patent No. 4984938, of adjusting the area of a region in which a diffraction grating of a diffraction grating cell is formed (hereinafter, may be simply referred to as diffraction grating forming region), to the same extent. That is, a plane diffraction grating pattern may be drawn by spreading diffraction grating cells whose areas of the diffraction grating forming region are of the same extent. Furthermore, as for the area of the diffraction grating forming region of the same extent, the area of the diffraction grating forming region of the diffraction grating cell to be used may be any area capable of reproducing a plane diffraction grating pattern, and the area is set as appropriate according to, for example, the size of the plane diffraction grating pattern to be reproduced, or the presence or absence of color display.

As a method for forming the steric diffraction grating pattern, examples may include a method of disposing diffraction grating cells whose amplitude of diffracted light is larger on the central side rather than the edge side of the diffraction grating pattern.

More specifically, in FIG. 11A, the character "F" is drawn with drawing lines formed by arranging three diffraction grating cells in the width direction (for example, 16a1, 16a2, and 16a3). In this case, by arranging diffraction grating cell 16a2, whose amplitude of diffracted light is larger than diffraction grating cells 16a1 and 16a3 arranged on the edge sides in the width direction of the drawing line, on the central side, the character "F" may be reproduced so as to be emerge stereoscopically when irradiated with reference light.

Furthermore, as a method of increasing the amplitude of diffracted light in the central side compared to the edge sides, examples may include a method of arranging a diffraction grating cell having a large diffraction grating forming region area on the central side rather than on the edge sides, as described in Japanese Patent No. 4984938. That is, the steric diffraction grating pattern may be arranged such that diffraction grating cells having a large diffraction grating forming region area is on the central side rather than on the edge sides of the diffraction grating pattern.

Figure 12:
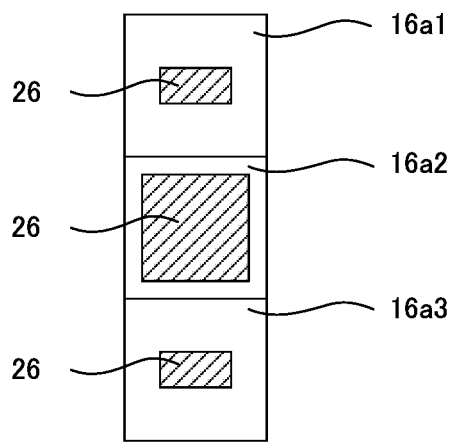
FIG. 12 is an illustrative drawing explaining a second hologram layer in the present disclosure.

For example, as exemplified in FIG. 12, which is a magnified diagram of diffraction gracing cells 16a1 to 16a3 in FIG. 11A, diffraction grating cell 16a2 to be arranged on the central side may be a diffraction grating cell having a larger diffraction grating forming region 26 area, rather than diffraction grating cells 16a1 and 16a3 arranged on the edge sides in the width direction of the drawing line.

The grating pitch, the grating angle, and the grating density (area proportion in plan view of diffraction grating cells in a pattern) of the diffraction grating cells arranged in a pattern for drawing a diffraction grating pattern (hereinafter, may be simply referred to as a diffraction grating cell) are set as appropriate according to the pattern reproduced when irradiated with reference light.

For example, a color image may be reproduced by setting the grating pitch to about 1.2 µm, about 1.0 µm, and about 0.8 µm, respectively, and by diffracting light having a wavelength of 600 nm (for red color), for 500 nm (for green color), and for 400 nm (for blue color), respectively.

Furthermore, various patterns may be exhibited in accordance with the grating angle and grating density.

The size in plan view of the diffraction grating cell may be set as appropriate according to the diffraction grating pattern to be reproduced; however, for example, may be 5 µm square or more and 100 µm square or less. This is because, when the size in plan view is in the range mentioned above, a high-precision diffraction grating pattern may be drawn. Furthermore, this is because the presence of individual diffraction grating cell drawing a diffraction grating pattern may be concealed.

The shape in plan view of the diffraction grating cells may be set as appropriate according to the diffraction grating pattern to be reproduced. For example, may be similar to the hologram cell described in the section of "1. Hologram layer" mentioned above.

The formation site of the second hologram layer may be on the same plane as the hologram layer, may be on a surface, that is the vapor deposition layer side, of the hologram layer, or on the surface that is opposite side to the vapor deposition layer. Examples in which the second hologram layer is formed on the same plane as the hologram layer may include a case in which a hologram layer and a second hologram layer are integrally formed, and a diffraction grating pattern is formed in a non-hologram region of the hologram layer.

Incidentally, FIG. 11B that has been previously explained shows an example in which the second hologram layer 6 is arranged on a surface, that is vapor deposition layer 2 side, of hologram layer 1.

The second hologram layer is usually arranged so that the diffraction grating pattern does not overlap the hologram forming region in plan view.

The reference light used for reproducing a diffraction grating pattern recorded in the second hologram layer is not particularly limited, and any reference light used in general holograms may be used.

Regarding the reference light, specifically, light including visible light may be used.

For example, the reference light may be identical to the point light source used for the reproduction of the hologram forming region of the hologram layer. This is because an optical image recorded in the hologram forming region may be reproduced simultaneously with the reproduction of a diffraction grating pattern recorded in the second hologram layer.

Furthermore, the reference light is not limited to a point light source and may also be, for example, parallel light such as solar light.

In the hologram structure mentioned above, for example, a diffraction grating pattern recorded in the second hologram layer may be reproduced by arranging thereof at a bright spot irradiated with reference light from a light source other than the point light source, and moreover, an optical image may also be reproduced by arranging the point light source on the hologram forming region at that bright spot.

The material that constitutes the second hologram layer is not particularly limited as long as the material is capable of forming a concavo-convex shape functioning as a diffraction grating included in a diffraction grating cell.

Such a material may be similar to the constituent material of the hologram layer described in the section of "1. Hologram layer" mentioned above.

The film thickness of the second hologram layer may be any thickness capable of stably forming a concavo-convex shape of the diffraction grating, and may similar to that of the hologram layer described in the section of "1. Hologram layer" mentioned above.

The hologram structure of the present embodiment may include a second vapor deposition layer formed so as to come into contact with the concavo-convex surface of the diffraction grating pattern of the second hologram layer.

Such a second vapor deposition layer is not particularly limited as long as the layer is capable of causing the second hologram layer to function as a reflection type hologram layer, those generally used in reflection type holograms may be used. Specifically, the second vapor deposition layer may be similar to the contents described in the section of "2. Vapor deposition layer" mentioned above.

(3) Interlayer Adhesive Layer

The hologram structure of the present embodiment may include an interlayer adhesive layer that adheres between various constitutions.

Incidentally, regarding the interlayer adhesive layer, those generally used in a hologram structure may be used, and may be selected as appropriate according to the materials that constitute, for example, the transparent substrate and the hologram layer.

Regarding the interlayer adhesive layer, for example, a known adhesive layer such as a two-liquid curable adhesive layer, an ultraviolet-curable adhesive layer, a heat-curable adhesive layer, and a hot melt type adhesive layer may be used.

The thickness of the interlayer adhesive layer is set as appropriate according to, for example, the size of the constitution to be adhered.

(4) Adhesive Layer

The hologram structure of the present embodiment may include an adhesive layer formed on a surface, that is opposite side to the hologram layer, of the vapor deposition layer. This is because, by including an adhesive layer, the hologram structure is capable of being attached easily to an adherend.

The adhesive layer may have transparency, or may have light-blocking property.

The adhesive layer may be a pressure-sensitive adhesive layer having pressure-sensitive adhesiveness, or may be a repeelable adhesive layer having both characteristics of adhesiveness and repeelability.

Incidentally, the adhesive layer may be an adhesive layer such as a two-liquid curable adhesive layer, an ultraviolet-curable adhesive layer, a heat-curable adhesive layer, and a hot melt type adhesive layer, similarly to the interlayer adhesive layer mentioned above.

When the adhesive layer is a pressure-sensitive adhesive layer, the hologram structure of the present embodiment may be strongly stuck to a desired member, and it is possible to make the hologram structure not easily detachable from an adherend.

Furthermore, when the adhesive layer is a repeelable adhesive layer, the hologram structure of the present embodiment may be stuck to a desired member by closely adhering the repeelable adhesive layer and an adherend such that air does not enter in between thereof. Such a repeelable adhesive layer is capable of easy repetition of adhesion and peeling without leaving any marks on the adherend caused by, for example, a pressure-sensitive adhesive, and may suppress any damage to the adherend.

When the adhesive layer is a pressure-sensitive adhesive layer, examples of the resin used for the pressure-sensitive adhesive layer may include an acrylic resin, an ester-based resin, a urethane-based resin, an ethylene-vinyl acetate-based resin, a latex-based resin, an epoxy-based resin, a polyurethane ester-based resin; fluororesins such as a vinylidene fluoride-based resin (PVDF) and a vinyl fluoride-based resin (PVF); and polyimide-based resins such as a polyimide, a polyamideimide, and a polyetherimide. Among the above, the resin is preferably an acrylic resin, a urethane-based resin, an ethylene-vinyl acetate-based resin, or a latex-based resin.

When the adhesive layer is a repeelable adhesive layer, examples of the resin used for the repeelable adhesive layer may include an acrylic resin, an acrylic acid ester resin, copolymers of these resins, a styrene-butadiene copolymer, natural rubber, casein, gelatin, a rosin ester, a terpene resin, a phenolic resin, a styrene-based resin, a coumarone-indene resin, a polyvinyl ether, and a silicone resin. Among the above, the resin is preferably an acrylic resin or a silicone resin. An acrylic resin is preferred because an acrylic resin enables adhesion even when the surface of an adherend is slightly uneven. Furthermore, a silicone resin is preferred because even if adhesion and peeling are repeated, the adhesive strength is not easily reduced.

The thickness of the adhesive layer is selected as appropriate according to, for example, the type or use of the hologram structure of the present embodiment. Usually, is preferably in a range of 1 µm to 500 µm, and more preferably in a range of 2 µm to 50 µm. This is because, when the thickness is in the range mentioned above, the adhesive layer acquires excellent adhesiveness.

(5) Peelable Sheet

The hologram structure of the present embodiment may include a peelable sheet arranged on the adhesive layer. The hologram structure of the present embodiment may be used by detaching the peelable sheet from the adhesive layer immediately before sticking the hologram structure to a desired adherend by means of the adhesive layer. Thereby, any foreign material may be prevented from attaching between the adhesive layer and the adherend.

The peelable sheet is not particularly limited as long as the sheet may protect the adhesive layer and may be easily peeled off from the adhesive layer. Such a peelable sheet may be a layer formed from, for example, polyethylene terephthalate (PET), polyethylene naphthalate (PEN), or polyphenylene sulfide (PPS).

The thickness of the peelable sheet is selected as appropriate according to, for example, the type or use of the hologram structure of the present embodiment.

The surface of the peelable sheet on the side that is brought into contact with the adhesive layer is preferably subjected to a peeling treatment, in order to facilitate the peeling operation from the adhesive layer. Such a treatment method may be, for example, a silicone treatment or an alkyd treatment; however, the treatment method is not particularly limited.

(6) Arbitrary Members

Furthermore, the hologram structure of the present embodiment may include, for example, an ultraviolet absorbing layer, an infrared absorbing layer, or an antireflective layer on the transparent substrate or on a non-hologram forming region of the hologram layer. By including such a layer, the hologram structure may be imparted with, for example, an ultraviolet absorbing function, an infrared absorbing function, or an antireflection function, and the hologram structure of the present embodiment may also be used as, for example, various filters.

Incidentally, these layers may be similar to those generally used; thus, the descriptions herein are omitted.

4. Hologram Structure

The hologram structure of the present embodiment may be used by adhering the hologram structure to an adherend, or may be used without being adhered to an adherend.

The embodiment of using the hologram structure by adhering to an adherend is not particularly limited as long as the hologram structure includes an adhesive layer used for the adhesion to an adherend. Examples thereof may include an embodiment in which the hologram structure further comprises an adhesive layer formed on a surface, that is opposite side to the hologram layer, of the vapor deposition layer, and the hologram structure is used as a hologram sticker (first use embodiment); and an embodiment in which the hologram structure further comprises: a heat sealing layer formed on a surface, that is opposite side to the hologram layer, of the vapor deposition layer; an easily peelable layer formed on a surface, that is opposite side to the vapor deposition layer, of the hologram layer; and a substrate for peeling formed on a surface, that is opposite side to the hologram layer, of the easily peelable layer, and the hologram structure is used as a hologram transfer foil (second use embodiment).

An example of the embodiment of using the hologram structure without adhering to an adherend may include an embodiment in which the hologram structure is used as an information recording medium (third use embodiment).

(1) First Use Embodiment

The first use embodiment of the hologram structure of the present embodiment is an embodiment in which the hologram structure further comprises an adhesive layer formed on a surface, that is opposite side to the hologram layer, of the vapor deposition layer, and the hologram structure is used as a hologram sticker.

Figure 13:
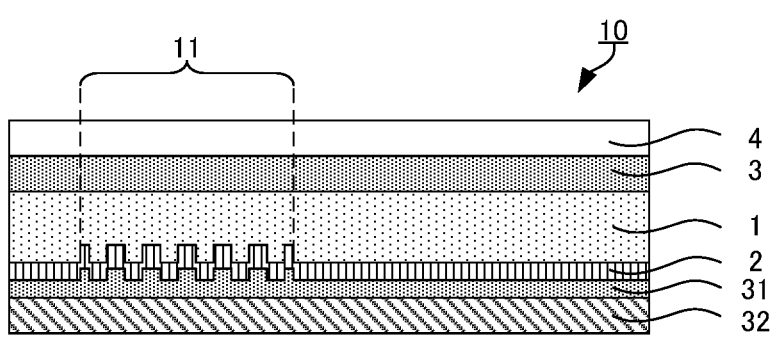
FIG. 13 is a schematic cross-sectional view showing another example of the hologram structure of the present disclosure.

Such a hologram structure of the present embodiment will be explained with reference to the drawings. FIG. 13 is a schematic cross-sectional view showing an example of the hologram structure of the present embodiment. As exemplified in FIG. 13, hologram structure 10 of the present embodiment includes adhesive layer 31 formed on a surface, that is opposite side to hologram layer 1, of vapor deposition layer 2, and is used as a hologram sticker.

Incidentally, the reference symbols used in FIG. 13 represent the same members as those in FIG. 1 and FIG. 2; thus, the descriptions herein are omitted.

Regarding this example, hologram structure 10 includes peelable sheet 32 on a surface, that is opposite side to vapor deposition layer 2, of adhesive layer 31.

According to the present embodiment, by including the adhesive layer, forgery preventability and designability may be easily imparted to an adherend.

Regarding specific uses of such a hologram structure of the present embodiment, examples may include a use application in which authenticity determination is performed using an optical image reproduced in a hologram forming region by attaching the hologram structure to, for example, a ticket, a brand-name good, or a quality control number label of a manufactured product, and disposing a point light source on the hologram forming region; and a use application of imparting designability.

The hologram structure of the present embodiment includes an adhesive layer.

Incidentally, the adhesive layer may be similar to the contents described in the section of "3. Other constitutions" mentioned above.

Furthermore, if necessary, the hologram structure may also include other constitution described in the section of "3. Other constitutions" mentioned above.

(2) Second Use Embodiment

The second use embodiment of the hologram structure of the present embodiment is an embodiment in which the hologram structure further comprises: a heat sealing layer formed on a surface, that is opposite side to the hologram layer, of the vapor deposition layer; an easily peelable layer formed on a surface, that is opposite side to the vapor deposition layer, of the hologram layer; and a substrate for peeling formed on a surface, that is opposite side to the hologram layer, of the easily peelable layer, and the hologram structure is used as a hologram transfer foil.

Figure 14:
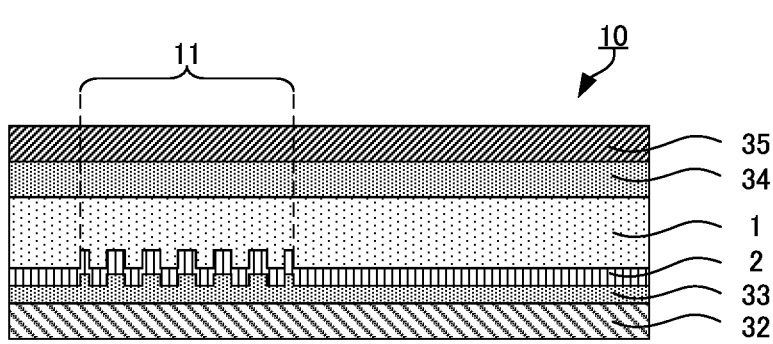
FIG. 14 is a schematic cross-sectional view showing another example of the hologram structure of the present disclosure.

Such a hologram structure of the present embodiment will be explained with reference to the drawings. FIG. 14 is a schematic cross-sectional view showing an example of the hologram structure of the present embodiment. As exemplified in FIG. 14, hologram structure 10 of the present embodiment includes heat sealing layer 33 formed on a surface, that is opposite side to hologram layer 1, of vapor deposition layer 2; easily peelable layer 34 formed on a surface, that is opposite side to vapor deposition layer 2, of hologram layer 1; and substrate for peeling 35 formed on a surface, that is opposite side to hologram layer 1, of easily peelable layer 34, and the hologram structure is used as a hologram transfer foil.

Incidentally, since the reference numerals in FIG. 14 represent the same members as those in FIG. 1 and FIG. 2; thus, the descriptions herein are omitted.

Regarding this example, hologram structure 10 includes peelable sheet 32 on a surface, that is opposite side to vapor deposition layer 2, of heat sealing layer 33.

According to the present embodiment, by including the hologram layer and the vapor deposition layer, forgery preventability and designability may be easily imparted to an adherend.

Furthermore, by forming a substrate for peeling via a peelable layer, on opposite side to the vapor deposition layer, of a hologram layer, the hologram structure may be prevented from being damaged before being attached to an adherend.

According to the present embodiment, by including the heat sealing layer, forgery preventability and designability may be easily imparted to an adherend.

Regarding specific uses of such a hologram structure of the present embodiment, examples may include a use application in which authenticity determination is performed using an optical image reproduced in a hologram forming region by transferring a desired pattern shape to, for example, a ticket, a brand-name good, or a quality control number label of a manufactured product, and disposing a point light source on the hologram forming region; and a use application of imparting designability.

The hologram structure of the present embodiment includes a heat sealing layer, an easily peelable layer, and a substrate for peeling.

Hereinafter, each constitution of the hologram structure of the present embodiment will be described in detail.

The heat sealing layer is a layer having a function of adhering the hologram layer and the vapor deposition layer to an adherend.

Such a heat sealing layer is not particularly limited as long as the heat sealing layer may adhere the hologram layer to an adherend, and is set as appropriate according to the type of the adherend to which the hologram layer and the vapor deposition layer are transferred from the hologram structure of the present embodiment.

Regarding the heat sealing layer, for example, a heat sealing layer containing a thermoplastic resin as described in JP-A 2014-16422 may be used.

The substrate for peeling is a substrate supporting, for example, the hologram layer and the vapor deposition layer.

The substrate for peeling is to be detached from the hologram structure after the hologram structure of the present embodiment is adhered to an adherend.

Such a substrate for peeling may have transparency, or may have light-blocking properties.

The material that constitutes the substrate for peeling and the film thickness may be similar to the transparent substrate described in the section of "3. Other constitutions" mentioned above; thus, the descriptions herein are omitted.

The easily peelable layer is provided in order to easily separate the substrate for peeling and the hologram layer after the hologram layer is adhered to an adherend by means of an adhesive layer.

Regarding such an easily peelable layer, the repeelable adhesive layer described in the section of "3. Other constitutions" mentioned above may be used.

The formation site in plan view of the easily peelable layer is not particularly limited as long as the easily peelable layer enables easy detachment of the substrate for peeling from the hologram layer.

The hologram structure of the present embodiment may include other constitution described in the section of "3. Other constitutions" mentioned above, if necessary.

(3) Third Use Embodiment

The third use embodiment of the hologram structure of the present embodiment is an embodiment used as an information recording medium.

Figure 15:
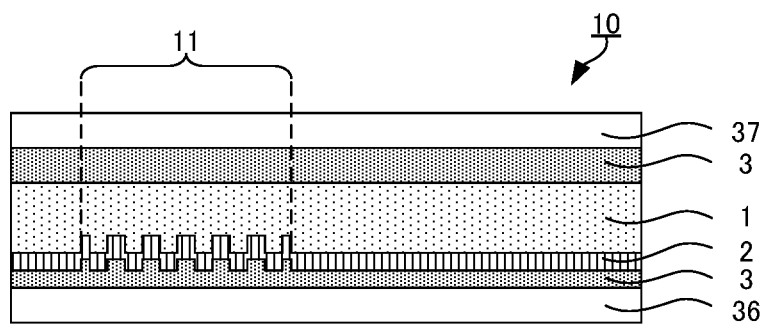
FIG. 15 is a schematic cross-sectional view showing another example of the hologram structure of the present disclosure.

Such a hologram structure of the present embodiment will be explained with reference to the drawings. FIG. 15 is a schematic cross-sectional view showing an example of the hologram structure of the present embodiment. As exemplified in FIG. 15, hologram structure 10 of the present embodiment includes back side protective layer 36 formed on a surface, that is opposite side to hologram layer 1, of vapor deposition layer 2; and front side protective layer 37 formed on a surface, that is opposite side to vapor deposition layer 2, of hologram layer 1, and is used as an information recording medium.

Incidentally, the reference numerals in FIG. 15 represent members that are identical to those in FIG. 1 and FIG. 2; thus, the descriptions herein are omitted.

According to the present embodiment, by using the hologram structure as an information recording medium, an information recording medium having excellent forgery preventability and designability may be acquired.

Regarding specific uses of the hologram structure of the present embodiment, examples may include cards such as credit cards, cash cards, and point cards; identification cards such as employee identity cards and driver's licenses; bank accounts; and passports.

The hologram structure of the present embodiment includes a hologram layer and a vapor deposition layer; however, the hologram structure may also include other constitutions according to the type of the information recording medium.

Examples of such other constitutions may include a back side protective layer formed on a surface, that is opposite side to the hologram layer, of the vapor deposition layer; and a front side protective layer formed on a surface, that is opposite side to the vapor deposition layer, of the hologram layer.

The front side protective layer is formed on a surface, that is opposite side to the vapor deposition layer, of the hologram layer; protects the hologram layer; and a layer having transparency is used at least for the region overlapping in plan view with the hologram forming region.

The back side protective layer is formed on a surface, that is opposite side to the hologram layer, of the vapor deposition layer; and protects the hologram layer and the vapor deposition layer. Such a back side protective layer may have transparency, or may have light-blocking properties.

The constituent materials and film thicknesses of such front side protective layer and back side protective layer may be similar to, for example, those of the transparent substrate described in the section of "3. Other constitutions" mentioned above.

Furthermore, the formation sites of the front side protective layer and the back side protective layer may be any sites that may protect, for example, the hologram layer. The protective layers may be formed so as to cover the entire surfaces of the hologram layer and the vapor deposition layer.

Examples of the other constitutions may include an information recording layer for recording information.

Examples of the information recording layer may include a printed layer in which information is recorded by printing; a magnetic layer in which information is magnetically recorded; and an IC chip layer including an integrated circuit (IC) chip.

The other constitutions may include a functional layer such as an antenna layer including an antenna.

The formation site of such an information recording layer and such a functional layer is not particularly limited as long as the site does not interrupt reproduction and visual recognition of an optical image in the hologram forming region. Examples of the formation site may include a surface, that is opposite side to the vapor deposition layer, of the hologram layer; the same plane as the hologram layer; and a surface, that is opposite side to the hologram layer, of the vapor deposition layer.

5. Production Method

A method for producing the hologram structure of the present embodiment is not particularly limited as long as the method is capable of producing a hologram structure including each constitutions mentioned above with high accuracy, and a method similar to a general method for forming a hologram structure may be used.

Examples of the production method, specifically, may include a method of preparing a transparent substrate and forming a hologram layer and a vapor deposition layer in this order.

6. Use

Regarding the use of the hologram structure of the present embodiment, the hologram structure may be used for the use in forgery prevention, and applications include information recording media including cards such as credit cards and cash cards.

Furthermore, the hologram structure may be produced to have an adhesive layer that may be adhered to another adherend, and thus the hologram structure may be used as, for example, a hologram structure seal that is attachable to an adherend.

The hologram structure may also be produced to have a heat sealing layer, and thus the hologram structure may be used as a hologram structure transfer foil that may be transferred to an adherend.

B. Second Embodiment

Next, the second embodiment of the hologram structure according to the present disclosure will be described.

The hologram structure of the present embodiment features the constitution of comprising: a hologram layer including a hologram forming region; and a vapor deposition layer formed so as to come into contact with a concavo-convex surface of the hologram forming region of the hologram layer, and the followings are arranged in the hologram forming region of the hologram layer: a hologram cell carrying a recorded phase type Fourier transform hologram that transforms an incident light from a point light source into a desired optical image; and a diffraction grating cell formed on a same plane as the hologram cell, the diffraction grating cell draws a diffraction grating pattern by being arranged in a pattern in plan view.

Such a hologram structure of the present embodiment will be explained with reference to the drawings.

Figure 16:
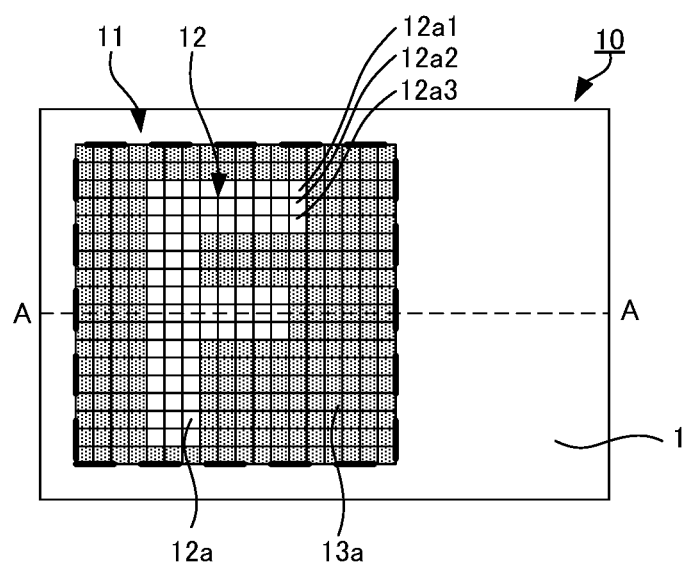
FIG. 16 is a schematic plan view showing an example of the hologram structure of the present disclosure.
Figure 17:
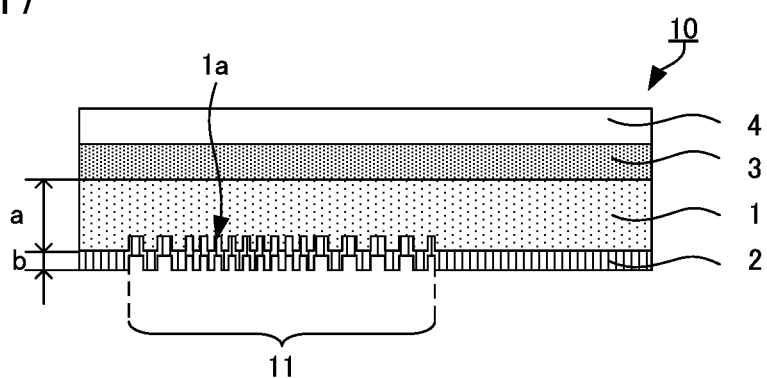
FIG. 17 is an A-A line cross-sectional view of FIG. 16.

FIG. 16 is a schematic plan view showing an example of the hologram structure of the present embodiment, and FIG. 17 is an A-A line cross-sectional view of FIG. 16. As shown in FIG. 16 and FIG. 17, hologram structure 10 of the present embodiment includes hologram layer 1 including hologram forming region 11, and vapor deposition layer 2 formed so as to come into contact with a concavo-convex surface of hologram forming region 11 of hologram layer 1. In hologram forming region 11 of hologram layer 1, hologram cell 13*a* carrying a recorded phase type Fourier transform hologram that transform an incident light from a point light source into a desired optical image; and diffraction grating cell 12a formed on a same plane as hologram cell 13a and draws diffraction grating pattern 12 by being arranged in a pattern in plan view, are arranged.

Incidentally, this example shows an example in which interlayer adhesive layer 3 and transparent substrate 4 are laminated in this order on a surface, that is opposite side to vapor deposition layer 2, of hologram layer 1.

Furthermore, in FIG. 16, the description of the transparent substrate and the interlayer adhesive layer is omitted for the convenience of explanation. In FIG. 16, the region surrounded by broken lines is hologram forming region 11. Diffraction grating cells 12a are arranged in a pattern of the character "F" and draw diffraction grating pattern 12 showing the character "F" when irradiated with reference light. Hologram cells 13a are arranged so as to embed sites where diffraction grating cells 12a of hologram forming region 11 are not arranged.

According to the present embodiment, since the hologram cell carrying a recorded phase type Fourier transform hologram that transform an incident light from a point light source into a desired optical image, and the diffraction grating cell that draw a diffraction grating pattern are arranged in the hologram forming region, both the optical image and the diffraction grating pattern may be reproduced in the hologram forming region.

Therefore, by combining the optical image and the diffraction grating pattern, the hologram structure acquires excellent forgery preventability and designability.

Furthermore, with the hologram structure, implement authenticity determination and expression of designability may be easily carried out without separately preparing, for example, a screen onto which an optical image is projected.

Furthermore, since an optical image may be reproduced only when irradiated with light from a point light source, the hologram structure acquires excellent forgery preventability and designability.

Figure 18A:
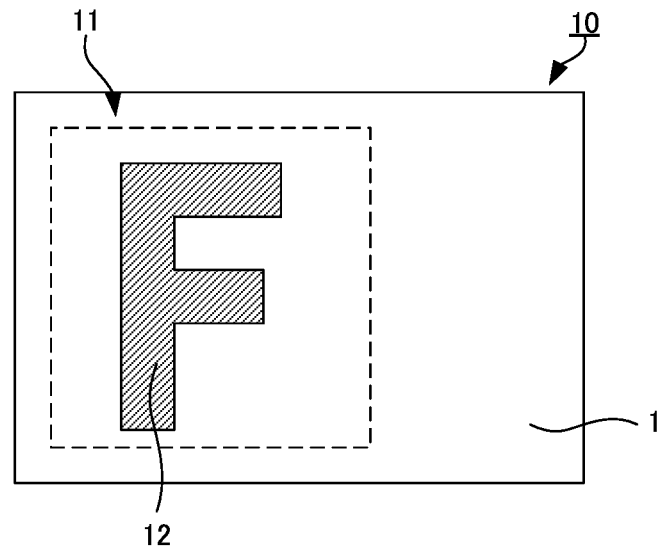
FIGS. 18A and 18B are illustrative drawings explaining usage examples of a hologram structure.
Figure 18B:
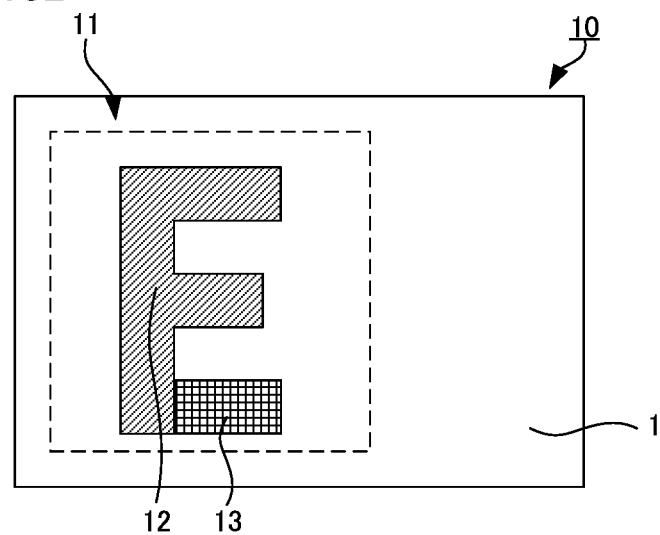

Examples of a use example of the hologram structure shown in FIG. 16 and FIG. 17 that has been previously explained may include a use example in which the hologram structure is used such that only the character "F" drawn as a diffraction grating pattern in the hologram forming region is observed when irradiated with reference light such as solar light and also a point light source is not arranged, that is, before reproduction of an optical image, as shown in FIG. 18A, for example; and the character of "E" is observed by the diffraction grating pattern and the optical image when a point light source is disposed on the hologram forming region, that is after reproduction of the optical image, as shown in FIG. 18B.

Thereby, an observer who does not know that the hologram cells capable of reproducing an optical image are arranged in addition to the diffraction grating cell that draw a diffraction grating pattern in the hologram forming region observes only the character "F". Meanwhile, only an observer who knows that the hologram cell is arranged is able to observe the character "E".

As such, the hologram structure of the present embodiment may exhibit, for example, a forgery preventing effect by enabling only an observer who knows the constitution of the hologram structure, to recognize an image obtained by combining an optical image and a diffraction grating pattern.

The hologram structure of the present embodiment includes a hologram layer and a vapor deposition layer.

In the following description, each constitution in the hologram structure of the present embodiment will be explained.

1. Hologram Layer

A hologram layer according to the present embodiment includes a hologram forming region.

Furthermore, in the hologram forming region of the hologram layer, a hologram cell carrying a recorded phase type Fourier transform hologram that transform an incident light from a point light source into a desired optical image; and a diffraction grating cell formed on a same plane as the hologram cell and draws a diffraction grating pattern by being arranged into a pattern in plan view, are arranged.

(1) Hologram Forming Region

The hologram forming region is of a reflection type, and is capable of reproducing an optical image in the hologram forming region when a point light source is disposed on the observation surface side and the hologram layer is observed in plan view from the observation surface side.

The hologram forming region is of a relief type and includes a concavo-convex surface.

The hologram forming region refers to a region in which hologram cells and diffraction grating cells are arranged, and specifically, is a region surrounded by a rectangle of the minimum area that may include all of the hologram cells and the diffraction grating cells.

The size in plan view of the hologram forming region is preferably a size at which the entirety of the whole image of the optical image in the hologram forming region may be visually recognized, and is preferably a size at which an observer may easily visually recognize an optical image and a diffraction grating pattern reproduced in the hologram forming region.

As exemplified in FIGS. 3A and 3B that has been previously explained, when the size in plan view of hologram forming region 11 is small, and the position of light source 21 is far from hologram structure 10 (FIG. 3A), observer 20 may be able to visually recognize only a portion of the whole image of optical image 13 (in FIG. 3B, the character "E") (FIG. 3B). Furthermore, as exemplified in FIGS. 4A and 4B that has been previously explained, in order to make the entirety of the whole image of optical image 13 in hologram forming region 11 having a small size in plan view visually recognizable, it is necessary to bring light source 21 closer to hologram structure 10 (FIG. 4A). However, in this case, the size of reproduced optical image 13 (in FIG. 4B, the character "E") is small, and observer 20 may have difficulties in visually recognizing the information displayed by optical image 13 (FIG. 4B).

In contrast to this, as exemplified in FIGS. 5A and 5B that has been previously explained, when the size in plan view of hologram forming region 11 being a predetermined size or more, observer 20 may visually recognize the entirety of the whole image of optical image 13 (in FIG. 5B, the character "E") in hologram forming region 11 (FIG. 5B), even when light source 21 is apart from hologram structure 10 (FIG. 5A). Furthermore, observer 20 may easily visually recognize the information displayed by reproduced optical image 13.

In the present embodiment, the size in plan view is preferably in a range of 5 mm square or more and 50 mm square or less, more preferably in a range of 5 mm square or more and 30 mm square or less, and particularly preferably in a range of 5 mm square or more and 15 mm square or less. This is because, when the lower limit of the size in plan view is in the range mentioned above, the hologram structure wherein the optical image in the hologram forming region is easily visibly recognizable may be obtained. As a result, the hologram structure acquires excellent forgery preventability and designability.

Furthermore, when the upper limit of the size in plan view is in the range mentioned above, the hologram structure promotes cost reduction, or the formation of an image displaying layer that displays an image used in combination with, for example, the optical image may be easily achieved.

Incidentally, other matters related to the hologram forming region may be similar to the contents described in the section of "1. Hologram layer" of "A. First embodiment" mentioned above; thus, the descriptions herein are omitted.

(2) Hologram Cell

A hologram cell according to the present embodiment carries a recorded phase type Fourier transform hologram that transforms an incident light from a point light source into a desired optical image.

Here, a phase type Fourier transform hologram being recorded means that the phase information of a Fourier transform image obtained through Fourier transformation of an original image is multivalued, and thereby the information is recorded as depth. Therefore, the hologram cell carrying a recorded phase type Fourier transform hologram includes a concavo-convex surface.

The hologram cell transforms an incident light from a point light source into a desired optical image, by means of the elevation difference of the concavo-convex shapes that constitute the concavo-convex surface of the hologram cell, that is, the hologram cell functions as a Fourier transform lens.

The proportion of the area in plan view occupied by the hologram cell in the hologram forming region is not particularly limited as long as a desired optical image may be reproduced; however, the proportion is preferably in a range of 25% to 80%, and more preferably in a range of 30% to 70%. This is because when the proportion of area is in the range mentioned above, the hologram structure is capable of clearly reproducing an optical image.

The concavo-convex shape of the concavo-convex surface of the hologram cell in the present embodiment corresponds to a pattern of a Fourier transform image obtainable when a plurality of multivalued Fourier transform images, formed based on the image data of an original image to be displayed as an optical image, are arrayed to a desired range in the vertical direction and the transverse direction.

The method for forming the concavo-convex surface of such a hologram cell in the hologram forming region may be any method capable of forming a concavo-convex surface capable of transforming an incident light from a point light source into a desired optical image, and a general method for forming a Fourier transform hologram may be used.

Specifically, the forming method mentioned above may include a method forming a concavo-convex surface of the hologram cell by forming a master original plate having a concavo-convex pattern corresponding to the Fourier transform image, and transferring the concavo-convex pattern of the original plate to a coating film of a resin material such as an ultraviolet-curable resin formed on a substrate such as PET.

Furthermore, a hologram layer including a hologram forming region in which a plurality of hologram cells are arranged may be formed by performing the transfer of the concavo-convex pattern of the master original plate several times.

Incidentally, other matters related to the hologram cell may be similar to the contents described in the section of "1. Hologram layer" of "A. First embodiment" mentioned above; thus, the descriptions herein are omitted.

(3) Diffraction Grating Cell

The diffraction grating cell is formed on a same plane as the hologram cell.

The diffraction grating cell draws a diffraction grating pattern by being arranged in a pattern in plan view in the hologram forming region.

Here, being formed on a same plane means that the hologram cell and the diffraction grating cell are formed on the same surface of the hologram layer. That is, it means that both the concavo-convex surface of hologram cell and the concavo-convex surface of diffraction grating cell are formed on the same surface of the hologram layer.

Regarding the diffraction grating pattern, the design of the pattern shape of the arranged diffraction grating cells is reproduced by irradiating with visible light as the reference light.

Here, the diffraction grating pattern is a pattern drawn with the diffraction grating cells arranged in a pattern in plan view, and is drawn by dividing an original pattern into, for example, checkerboard-shaped fine cells, and transferring the divided fine cells to diffraction grating cells.

FIG. 16 that has been previously explained shows an example in which diffraction grating pattern 12 is drawn with diffraction grating cells 12a arranged in a pattern of the character "F", and when diffraction grating pattern 12 is irradiated with reference light, the character "F" is reproduced as diffraction grating pattern 12 in hologram forming region 11.

The pattern is preferably a pattern capable of enhancing forgery preventability and designability by being combined with an optical image.

Specifically, the pattern may be set as appropriate according to, for example, the use of the hologram structure of the present embodiment, and examples may include a pattern, a line drawing, a character, a figure, and a symbol.

Figure 19A:
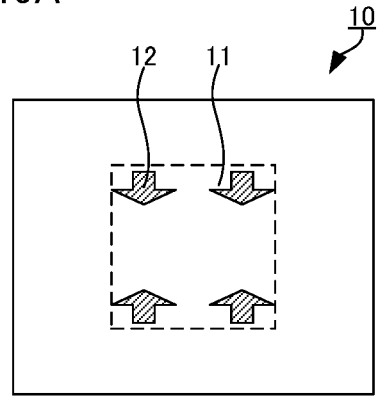
FIGS. 19A to 19F are illustrative drawings explaining a diffraction grating pattern in the present disclosure.
Figure 19B:
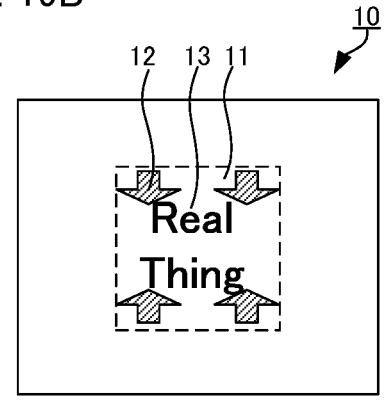
Figure 19C:
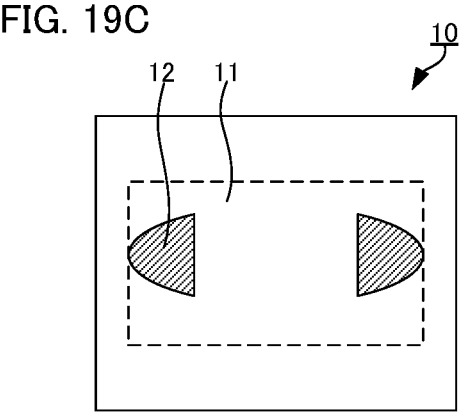
Figure 19D:
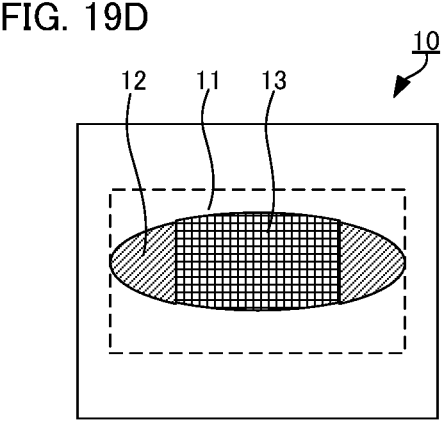
Figure 19E:
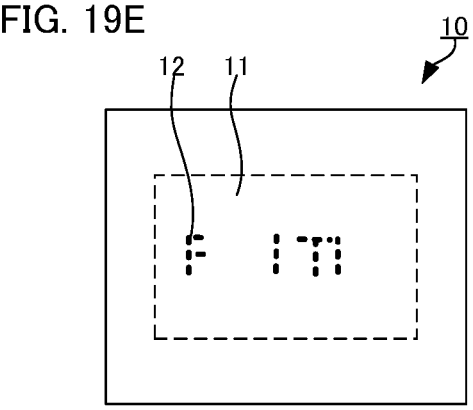
Figure 19F:
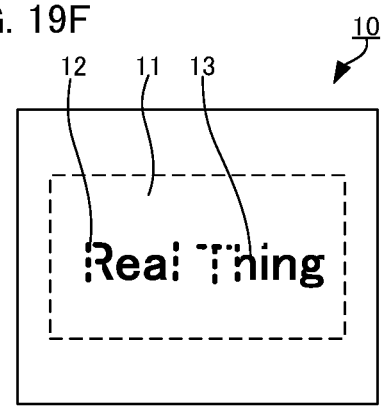

Specific examples of a pattern capable of particularly enhancing forgery preventability and designability when combined with the optical image, compared to the case of using an optical image only, may include patterns used for the recognition of an optical image as exemplified in FIG. 19A and FIG. 19B, such as an arrow indicating the reproduction site of the optical image, a frame surrounding the reproduction site of the optical image, and a character indicating that a certain site is the reproduction site of the optical image; when the optical image shows a portion of a figure as exemplified in FIG. 19C and FIG. 19D, a pattern that shows the other parts of the figure; when the optical image is an image showing a portion of a character string or a number sequence as exemplified in FIGS. 18A and 18B that has been previously explained, and FIG. 19E and FIG. 19F, a pattern showing the other parts of the character string or number sequence; when the optical image is an image displaying the sun, an image that forms a single image imparting a unity feeling by the combination with an optical image reproduced in the hologram forming region, such as an image showing the background such as clouds and the sky disposed around the sun.

Incidentally, FIG. 19A, FIG. 19C, and FIG. 19E each represents the state before reproduction of the optical image, and FIG. 19B, FIG. 19D, and FIG. 19F each represents the state at the time of reproducing the optical image.

In FIG. 19A and FIG. 19B, diffraction grating pattern 12 is the arrows indicating the reproduction site of optical image 13 in the hologram forming region 11. In FIG. 19C and FIG. 19D, diffraction grating pattern 12 is a portion of an ellipse, and is capable of displaying one ellipse in combination with the other part of the ellipse shown by optical image 13. In FIG. 19E and FIG. 19F, diffraction grating pattern 12 is a portion of a character string of "Real Thing", and is capable of displaying one meaningful character string "Real Thing" when combined with the other parts of the character string "Real Thing" shown by optical image 13.

The diffraction grating pattern may be a plane diffraction grating pattern capable of reproducing a planar pattern, or may be a steric diffraction grating pattern capable of reproducing a stereoscopic pattern.

In FIG. 16, the character "F" is drawn with drawing lines formed by arranging three diffraction grating cells in the width direction (for example, 12a1, 12a2, and 12a3). In this case, by arranging diffraction grating cell 12a2 whose amplitude of diffracted light is larger than diffraction grating cells 12a1 and 12a3 arranged on the edge sides in the width direction of the drawing line, on the central side, the character "F" may be reproduced so as to be emerge stereoscopically when irradiated with reference light.

The proportion of the area in plan view occupied by the diffraction grating cell in the hologram forming region is not particularly limited as long as a desired diffraction grating pattern may be drawn.

The proportion of a total area of the diffraction grating cell to a total area of the hologram cell in the hologram forming region (the total area of the diffraction grating cell/the total area of the hologram cell) is not particularly limited as long as both the optical image and the diffraction grating pattern may be clearly reproduced. However, when the diffraction grating pattern is a planar diffraction grating pattern, the proportion is preferably in a range of 1/4 to 3/2, more preferably in a range of 1/2 to 1, and particularly preferably in a range of 5/8 to 7/8. This is because, when the proportion of area is in the range mentioned above, the hologram structure exhibits excellent visibility in both the optical image and the planar diffraction grating pattern.

Furthermore, when the diffraction grating pattern is a steric diffraction grating pattern, the total area proportion is preferably in a range of 1/3 to 3, more preferably in a range of 2/3 to 2, and particularly preferably in a range of 1 to 5/3. This is because when the proportion of area is in the range mentioned above, the hologram structure exhibits excellent visibility in both the optical image and the steric diffraction grating pattern.

Regarding the method for forming the concavo-convex surface of the diffraction grating cell in the hologram forming region, the method may be similar to a general method for forming a diffraction grating pattern.

The reference light used for the reproduction of the diffraction grating pattern is not particularly limited, and any reference light used for general holograms may be used.

Regarding the reference light, specifically, light including visible light may be used.

For example, the reference light may be identical to the point light source used for the reproduction of the optical image recorded in the hologram cell of the hologram layer. This is because reproduction of an optical image recorded in the hologram forming region and reproduction of a diffraction grating pattern may be achieved simultaneously.

Incidentally, other matters regarding the diffraction grating pattern and the diffraction grating cell may be similar to the contents described in the section of "(b) Second hologram layer" of "(2) Image displaying layer" of "3. Other constitutions" of "A. First embodiment" mentioned above; thus, the descriptions herein are omitted.

(4) Others

The material that constitutes the hologram layer is not particularly limited as long as the material is capable of forming the concavo-convex surface of the hologram cell exhibiting the Fourier transform lens function and the concavo-convex surface of the diffraction grating cell forming the diffraction grating pattern in the hologram forming region, and is capable of exhibiting a predetermined refractive index.

Incidentally, other matters regarding the hologram layer, such as the material of the hologram layer, may be similar to the contents described in the section of "1. Hologram layer" of "A. First embodiment"; thus, the descriptions herein are omitted.

2. Vapor Deposition Layer

The vapor deposition layer according to the present embodiment is formed so as to come into contact with the concavo-convex surface of the hologram forming region of the hologram layer.

The formation site of the vapor deposition layer may be any site that overlaps in plan view with at least the entire concavo-convex surface in the hologram forming region (concavo-convex surfaces of both the hologram cell and the diffraction grating cell), and may cover the entire surface on the concavo-convex surface side of the hologram layer.

Incidentally, since other matters regarding the vapor deposition layer may be similar to the contents described in the section of "2. Vapor deposition layer" of "A. First embodiment" mentioned above; thus, the descriptions herein are omitted.

3. Other Constitutions

The hologram structure of the present embodiment includes a hologram layer; however, the hologram structure may also include other constitutions as necessary.

(1) Transparent Substrate

The hologram structure of the present embodiment may include a transparent substrate formed on a surface, that is opposite side to the vapor deposition layer, of the hologram layer. This is because when the hologram structure includes a transparent substrate, the thermal or mechanical strength of the hologram structure of the present embodiment may be increased.

Incidentally, other matters regarding the transparent substrate may be similar to the contents described in the section of "(1) Transparent substrate" of "3. Other constitutions" of "A. First embodiment" mentioned above; thus, the descriptions herein are omitted.

(2) Image Displaying Layer

The hologram structure of the present embodiment preferably includes an image displaying layer that displays an image used in combination with the optical image.

This is because the image displayed by the image displaying layer and the optical image reproduced in the hologram forming region may be combined, and thus the hologram structure acquires excellent forgery preventability and designability.

Here, the image is not particularly limited as long as the image is capable of enhancing forgery preventability and designability by being combined with an optical image. The image may also be used in combination with the diffraction grating pattern formed in the hologram forming region.

Specifically, the image may be set as appropriate according to, for example, the use of the hologram structure of the present embodiment, and examples may include, not only a pattern, a line drawing, a character, a figure, and a symbol, but also an embodiment in which the entire surface is simply colored.

Figure 20A:
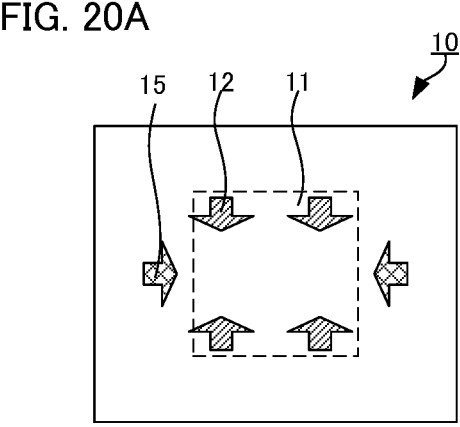
FIGS. 20A to 20F are illustrative drawings explaining an image displaying layer in the present disclosure.
Figure 20B:
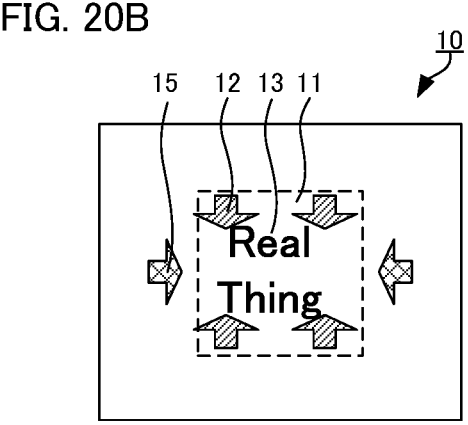
Figure 20C:
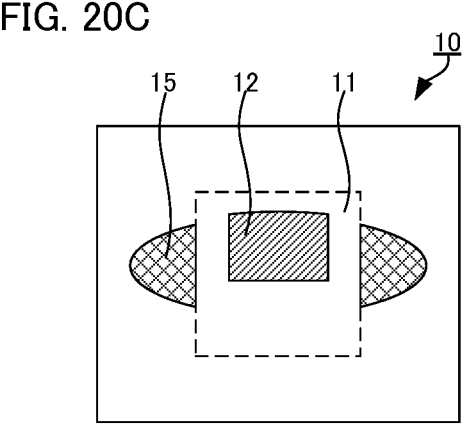
Figure 20D:
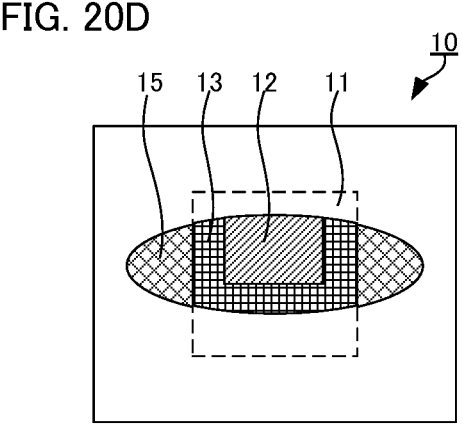
Figure 20E:
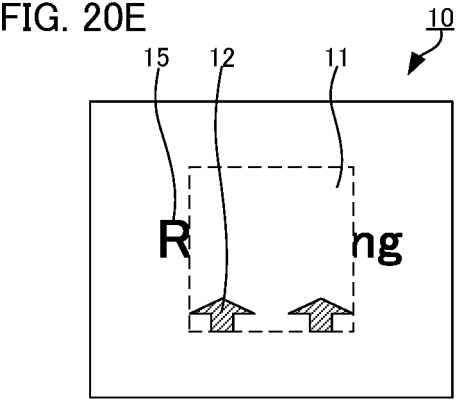
Figure 20F:
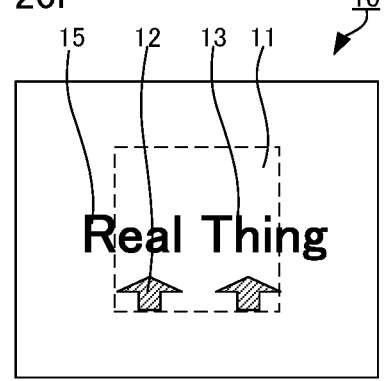

Furthermore, regarding an image that may further enhance forgery preventability and designability when combined with the optical image, examples may include images used for the recognition of the hologram forming region as exemplified in FIG. 20A and FIG. 20B, such as an arrow indicating the formation site of the hologram forming region, a frame surrounding the formation site, and a character indicating that a certain site is the formation site; when the optical image and the diffraction grating pattern display a portion of a figure as exemplified in FIG. 20C and FIG. 20D, an image that displays the other parts of the figure; when the optical image is an image displaying a portion of a character string or a number sequence as exemplified in FIG. 20E and FIG. 20F, an image displaying the other parts of the character string or number sequence; and when the optical image is an image displaying the sun, an image that forms a single image imparting a unity feeling by the combination with an optical image reproduced in the hologram forming region, such as an image displaying the background such as clouds and the sky disposed around the sun.

Incidentally, FIG. 20A, FIG. 20C, and FIG. 20E each represents the state before reproduction of the optical image, and FIG. 20B, FIG. 20D, and FIG. 20F each represents the state at the time of reproducing the optical image.

Furthermore, in FIG. 20A and FIG. 20B, images 15 are the arrows indicating the formation site of hologram forming region 11, and is capable of reproducing a character string displaying "Real Thing" as optical image 13 in the hologram forming region 11. In FIG. 20C and FIG. 20D, image 15 is a portion of an ellipse, and is capable of displaying one ellipse in combination with the other part of the ellipse displayed by optical image 13 and diffraction grating pattern 12. In FIG. 20E and FIG. 20F, image 15 is a portion of a character string of "Real Thing", and is capable of displaying one meaningful character string "Real Thing" when combined with the other parts of the character string "Real Thing" displayed by optical image 13.

The image displaying layer may be any layer capable of displaying a desired image, and examples may include a printed layer containing a colorant and a resin material; and a second hologram layer containing a diffraction grating pattern drawn with a diffraction grating cell arranged in a pattern in plan view.

In the printed layer, an image of various colors and patterns may be easily drawn. The second hologram layer is capable of displaying an image only when the layer is irradiated with reference light. Therefore, the printed layer and the second hologram layer are capable of easily forming a hologram structure having excellent forgery preventability and designability.

The image displaying layer may be of only one kind, or two kinds or more may be used in combination. For example, the image displaying layer may be configured to include a plurality of printed layers, or to include a printed layer and a second hologram layer.

In the following description, the printed layer and the second hologram layer will be explained.

(a) Printed Layer

The printed layer contains a colorant and a resin material.

The formation position of the printed layer is not particularly limited as long as the position does not interrupt reproduction and visual recognition of an optical image and a diffraction grating pattern in the hologram forming region, and the position may be on the surface, that is opposite side to the vapor deposition layer, of the hologram layer; on the same plane as the hologram layer; or on the surface, that is opposite side to the hologram layer, of the vapor deposition layer.

Figure 21:
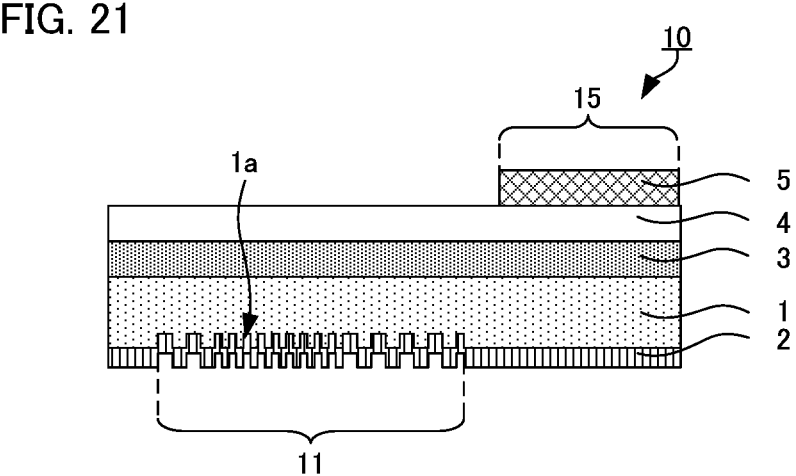
FIG. 21 is a schematic cross-sectional view showing another example of the hologram structure of the present disclosure.

FIG. 21 shows an example in which printed layer 5 is formed on a surface, that is opposite side to hologram layer 1, of transparent substrate 4.

Incidentally, other matters regarding the printed layer may be similar to the contents described in the section of "(a) Printed layer" of "(2) Image displaying layer" of "3. Other constitutions" of "A. First embodiment" mentioned above; thus, the descriptions herein are omitted.

(b) Second Hologram Layer

The second hologram layer contains a diffraction grating pattern drawn with a diffraction grating cell arrayed in a pattern in plan view, and a pattern, having a shape of an arranged pattern of the diffraction grating cells, is reproduced when irradiated with the reference light.

Such diffraction grating pattern, diffraction grating cell, and reference light may be similar to the contents described in the section of "1. Hologram layer" mentioned above; thus, the descriptions herein are omitted.

Figure 22:
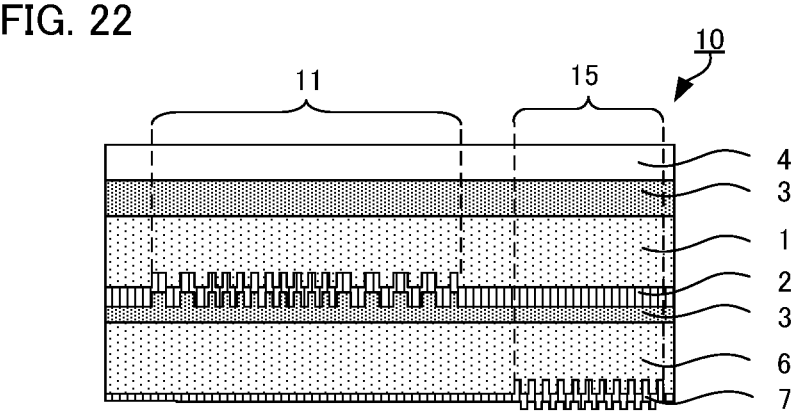
FIG. 22 is a schematic cross-sectional view showing another example of the hologram structure of the present disclosure.

FIG. 22 shows an example in which second hologram layer 6 is disposed on the surface on vapor deposition layer 2 side of hologram layer 1.

Incidentally, other matters regarding the second hologram layer may be similar to the contents described in the section of "(b) Second hologram layer" of "(2) Image displaying layer" of "3. Other constitutions" of "A. First embodiment" mentioned above; thus, the descriptions herein are omitted.

(3) Interlayer Adhesive Layer

The hologram structure of the present embodiment may include an interlayer adhesive layer that adheres between various constitutions.

Incidentally, other matters regarding the interlayer adhesive layer may be similar to the contents described in the section of "(3) Interlayer adhesive layer" of "3. Other constitutions" of "A. First embodiment" mentioned above; thus, the descriptions herein are omitted.

(4) Adhesive Layer

The hologram structure of the present embodiment may include an adhesive layer formed on a surface, that is opposite side to the hologram layer, of the vapor deposition layer. This is because, by including an adhesive layer, the hologram structure is capable of being attached easily to an adherend.

Incidentally, since other matters regarding the adhesive layer may be similar to the contents described in the section of "(4) Adhesive layer" of "3. Other constitutions" of "A. First embodiment" mentioned above; thus, the descriptions herein are omitted.

(5) Peelable Sheet

The hologram structure of the present embodiment may include a peelable sheet arranged on the adhesive layer. The hologram structure of the present embodiment may be used by detaching the peelable sheet from the adhesive layer immediately before sticking the hologram structure to a desired adherend by means of the adhesive layer. Thereby, any foreign material may be prevented from attaching between the adhesive layer and the adherend.

Incidentally, since other matters regarding the peelable sheet may be similar to the contents described in the section of "(5) Peelable sheet" of "3. Other constitutions" of "A. First embodiment" mentioned above; thus, the descriptions herein are omitted.

(6) Arbitrary Members

Furthermore, the hologram structure of the present embodiment may include, for example, an ultraviolet absorbing layer, an infrared absorbing layer, or an antireflective layer on the transparent substrate or on a non-hologram forming region of the hologram layer. By including such a layer, the hologram structure may be imparted with, for example, an ultraviolet absorbing function, an infrared absorbing function, or an antireflection function, and the hologram structure of the present embodiment may also be used as, for example, various filters.

Incidentally, these layers may be similar to those generally used; thus, the descriptions herein are omitted.

4. Hologram Structure

The hologram structure of the present embodiment may be used by adhering the hologram structure to an adherend, or may be used without being adhered to an adherend.

The embodiment of using the hologram structure by adhering to an adherend is not particularly limited as long as the hologram structure includes an adhesive layer used for the adhesion to an adherend. Examples thereof may include an embodiment in which the hologram structure further comprises an adhesive layer formed on a surface, that is opposite side to the hologram layer, of the vapor deposition layer, and the hologram structure is used as a hologram sticker (first use embodiment); and an embodiment in which the hologram structure further comprises: a heat sealing layer formed on a surface, that is opposite side to the hologram layer, of the vapor deposition layer; an easily peelable layer formed on a surface, that is opposite side to the vapor deposition layer, of the hologram layer; and a substrate for peeling formed on a surface, that is opposite side to the hologram layer, of the easily peelable layer, and the hologram structure is used as a hologram transfer foil (second use embodiment).

An example of the embodiment of using the hologram structure without adhering to an adherend may include an embodiment in which the hologram structure is used as an information recording medium (third use embodiment).

Incidentally, each use embodiment of the hologram structure of the present embodiment may be similar to the contents described in the section of "4. Hologram structure" of "A. First embodiment" mentioned above; thus, the descriptions herein are omitted.

5. Production Method

A method for producing the hologram structure of the present embodiment may be similar to the contents described in the section of "5. Production method" of "A. First embodiment" mentioned above; thus, the descriptions herein are omitted.

6. Use

The use of the hologram structure of the present embodiment may be similar to the contents described in the section of "6. Use" of "A. First embodiment" mentioned above; thus, the descriptions herein are omitted.

The present disclosure is not limited to the embodiments mentioned above. The embodiments are exemplification, and any other variations are intended to be included in the technical scope of the present disclosure if they have substantially the same constitution as the technical idea described in the claim of the present disclosure and offer similar operation and effect thereto.

EXAMPLES

Hereinafter, the present disclosure will be described in more detail by way of Examples.

Example 1-1

<Formation of Original Plate and Hologram Structure>

On a chromium thin film of a photomask blank plate, including a low-reflective surface chromium thin film laminated on a substrate of synthetic quartz, a resist for dry etching was spin coated using a spinner. Regarding the resist for dry etching, ZEP7000 manufactured by Zeon Corp. was used, and was formed so as to have a thickness of 400 nm. This resist layer was exposed to form a pattern that had been produced in advance with a calculator using an electron beam drawing apparatus (MEBES4500: manufactured by Etec Systems, Inc.), and the exposed portions of the resist resin were made easily soluble. Subsequently, a developer liquid was sprayed (spray developing) to remove the easily soluble portions, and a resist pattern was formed.

Incidentally, the grating pitch of the pattern was set to 3,179 nm.

Subsequently, the chromium thin film of the parts that were not covered with the resist were etched and removed by dry etching, by utilizing the formed resist pattern, and the quartz substrate was exposed. Next, the exposed quartz substrate was etched, and concavities were formed on the quartz substrate. Subsequently, the resist thin film was dissolved and removed, and thereby an original plate having concavities produced by etching the quartz substrate, and convexities in which the quartz substrate and the chromium thin film are remained without being etched, was obtained. The size of the original plate, that is, the size of a hologram cell was set to 0.25 mm.

A composition for forming hologram layer (UV-curable acrylate resin; refractive index: 1.52, and measurement wavelength: 633 nm) was dropped on a polycarbonate sheet (transparent substrate) having a thickness of 0.5 mm, and a coating film of the composition was formed. Next, the original plate having concavo-convex was mounted on the coating film, and the assembly was pressed. Next, the coating film was cured by irradiating with active radiation, and then, was peeled off. Thus, a hologram cell having a concavo-convex surface, which was an inversion of the concavo-convex shape of the original plate, was formed. Subsequently, mounting of the original plate, pressing, curing, and peeling were repeated, and thus a hologram layer having a thickness of 2 μm and including a hologram forming region of 15 mm square, which was covered with hologram cells over, was formed.

Next, an Al layer having a film thickness of 100 nm was formed over the entire surface on the concavo-convex surface side of the hologram layer by a sputtering method, and thus a hologram structure was obtained.

<Evaluation>

A point light source was disposed at a position 50 mm away from the hologram layer surface of the hologram structure, and was observed from a site 300 mm away from the hologram layer surface. A predetermined Fourier-transformed image was observed with good visibility in the hologram forming region of 15 mm square.

Example 2-1

<Formation of Original Plate for Diffraction Grating Cell and Diffraction Grating Pattern>

On a chromium thin film of a photomask blank plate, including a low-reflective surface chromium thin film laminated on a substrate of synthetic quartz, a resist for dry etching was spin coated using a spinner. Regarding the resist for dry etching, ZEP7000 manufactured by Zeon Corp. was used, and was formed so as to have a thickness of 400 nm. This resist layer was exposed to form a pattern that had been produced in advance with a calculator using an electron beam drawing apparatus (MEBES4500: manufactured by Etec Systems, Inc.), and the exposed portions of the resist resin were made easily soluble. Subsequently, a developer liquid was sprayed (spray developing) to remove the easily soluble portions, and a resist pattern was formed.

Incidentally, the grating pitch of the pattern was set to 500 nm.

Subsequently, the chromium thin film of the parts that were not covered with the resist were etched and removed by dry etching, by utilizing the formed resist pattern, and the quartz substrate was exposed. Next, the exposed quartz substrate was etched, and concavities were formed on the quartz substrate. Subsequently, the resist thin film was dissolved and removed, and thereby an original plate having concavities produced by etching the quartz substrate, and convexities in which the quartz substrate and the chromium thin film are remained without being etched, was obtained. The size of the original plate, that is, the size of a diffraction grating cell was set to 0.25 mm.

A composition for forming hologram layer (UV-curable acrylate resin; refractive index: 1.52, and measurement wavelength: 633 nm) was dropped on a polycarbonate sheet (transparent substrate) having a thickness of 0.5 mm, and a coating film of the composition was formed. Next, the original plate having concavo-convex was mounted on the coating film, and the assembly was pressed. Next, the coating film was cured by irradiating with active radiation, and then, was peeled off. Thus, a diffraction grating cell having a concavo-convex surface, which was an inversion of the concavo-convex shape of the original plate, was formed. Subsequently, mounting of the original plate, pressing, curing, and peeling were repeated, and thus a plane diffraction grating pattern was formed with a diffraction grating cell in a hologram forming region of 15 mm square.

<Formation of Original Plate for Hologram Cell and Hologram Cell>

An original plate was obtained by a method similar to that of the original plate for a diffraction grating cell.

The size of the original plate, that is, the size of the hologram cell, was set to 0.25 mm.

The grating pitch of the pattern was set to 3,179 nm. Next, mounting of the original plate, pressing, curing, and peeling were repeated on the coating film after the formation of the diffraction grating pattern, and thus a hologram layer having a thickness of 2 μm and including a hologram forming region of 15 mm square, which was covered with hologram cells in the region where diffraction grating cells were not arranged, was formed.

Next, an Al layer having a film thickness of 100 nm was formed over the entire surface on the concavo-convex surface side of the hologram layer by a sputtering method, and thus a hologram structure was obtained.

<Evaluation>

The hologram structure was observed under a fluorescent lamp, and the diffraction grating pattern could be reproduced in the hologram forming region. Furthermore, a point light source was disposed at a position 50 mm away from the hologram layer surface of the hologram structure, and was observed from a site 300 mm away from the hologram layer surface. Both a predetermined Fourier-transformed image and the diffraction grating pattern were observed with good visibility in the hologram forming region of 15 mm square.

REFERENCE SIGNS LIST

1 Hologram layer
1a Concavo-convex surface
2 Vapor deposition layer
3 Interlayer adhesive layer
4 Transparent substrate
5 Printed layer
6 Second hologram layer
7 Second vapor deposition layer
10 Hologram structure
11 Hologram forming region
11a, 13a Hologram cell
12 Diffraction grating pattern
12a, 16a Diffraction grating cell
13 Optical image
15 Image
31 Adhesive layer
32 Peelable sheet
33 Heat sealing layer
34 Easily peelable layer
35 Substrate for peeling
36 Back side protective layer
37 Front side protective layer

The invention claimed is:

1. A hologram structure comprising:
a hologram layer including a reflection type hologram forming region carrying a recorded phase type Fourier transform hologram that transforms an incident light from a point light source into a desired optical image; and
a vapor deposition layer formed so as to come into contact with a concavo-convex surface of the reflection type hologram forming region of the hologram layer, and
a size of the reflection type hologram forming region in plan view is in a range of 5 mm square or more and 50 mm square or less,
wherein the hologram structure further comprises an image displaying layer that displays an image used in combination with the optical image, and the image displaying layer is formed on a side opposite to the vapor deposition layer side of the hologram layer or on a side opposite to the hologram layer side of the vapor deposition layer.

2. The hologram structure according to claim 1, wherein the reflection type hologram forming region includes a plurality of arrayed hologram cells capable of transforming an incident light from a point light source into the optical image, and
a size of the hologram cell in plan view is in a range of 0.25 mm square or more and 5 mm square or less.

3. The hologram structure according to claim 1, wherein a grating pitch of the concavo-convex surface is in a range of 1.0 μm to 80.0 μm.

4. The hologram structure according to claim 1, wherein the image displaying layer includes a printed layer containing a colorant and a resin material.

5. The hologram structure according to claim 1, wherein the image displaying layer includes a second hologram layer containing a diffraction grating pattern drawn with a diffraction grating cell arranged in a pattern in plan view.

6. The hologram structure according to claim 5, wherein the diffraction grating pattern is a plane diffraction grating pattern capable of reproducing a planar pattern.

7. The hologram structure according to claim 5, wherein the diffraction grating pattern is a steric diffraction grating pattern capable of reproducing a stereoscopic pattern.

8. The hologram structure according to claim 1, wherein the hologram structure further comprises an adhesive layer formed on a surface, that is opposite side to the hologram layer, of the vapor deposition layer, and the hologram structure is used as a hologram sticker.

9. The hologram structure according to claim 1, wherein the hologram structure further comprises:
- a heat sealing layer formed on a surface, that is opposite side to the hologram layer, of the vapor deposition layer;
- an easily peelable layer formed on a surface, that is opposite side to the vapor deposition layer, of the hologram layer; and
- a substrate for peeling formed on a surface, that is opposite side to the hologram layer, of the easily peelable layer, and the hologram structure is used as a hologram transfer foil.

10. The hologram structure according to claim 1, wherein the hologram structure is used as an information recording medium.

11. A hologram structure comprising:
- a hologram layer including a hologram forming region; and
- a vapor deposition layer formed so as to come into contact with a concavo-convex surface of the hologram forming region of the hologram layer, and the followings are arranged in the hologram forming region of the hologram layer:
- a hologram cell carrying a recorded phase type Fourier transform hologram that transforms an incident light from a point light source into a desired optical image; and
- a diffraction grating cell formed on a same plane as the hologram cell, the diffraction grating cell reproduces a diffraction grating pattern by being arranged in a pattern in plan view, wherein the diffraction grating pattern is a steric diffraction grating pattern capable of reproducing a stereoscopic pattern.

12. The hologram structure according to claim 11, wherein a proportion of a total area of the diffraction grating cell to a total area of the hologram cell in the hologram forming region (the total area of the diffraction grating cell/the total area of the hologram cell) is in a range of 1/3 to 3.

* * * * *